US012688618B2

(12) United States Patent
Lasserre

(10) Patent No.: US 12,688,618 B2
(45) Date of Patent: Jul. 21, 2026

(54) METHOD AND APPARATUS OF ENCODING/DECODING SERIES OF DATA

(71) Applicant: Beijing Xiaomi Mobile Software Co., Ltd., Beijing (CN)

(72) Inventor: Sebastien Lasserre, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 233 days.

(21) Appl. No.: 18/715,919

(22) PCT Filed: Oct. 27, 2022

(86) PCT No.: PCT/CN2022/128085
§ 371 (c)(1),
(2) Date: Jun. 3, 2024

(87) PCT Pub. No.: WO2023/103639
PCT Pub. Date: Jun. 15, 2023

(65) Prior Publication Data
US 2025/0037318 A1      Jan. 30, 2025

(30) Foreign Application Priority Data
Dec. 10, 2021      (EP) ..................................... 21306741

(51) Int. Cl.
*G06T 9/00* (2006.01)
*G06T 9/40* (2006.01)
(52) U.S. Cl.
CPC ................ *G06T 9/001* (2013.01); *G06T 9/40* (2013.01)

(58) Field of Classification Search
CPC ............ G06T 9/001; G06T 9/40; G06T 9/005
See application file for complete search history.

(56) References Cited

U.S. PATENT DOCUMENTS

| | | | | |
|---|---|---|---|---|
| 12,380,604 B2 * | 8/2025 | Lee | .......................... | H04N 19/70 |
| 12,450,783 B2 * | 10/2025 | Pham Van | .............. | G06T 9/001 |
| 2019/0081638 A1 * | 3/2019 | Mammou | ............. | H04N 19/436 |
| 2020/0104976 A1 * | 4/2020 | Mammou | ................. | G06T 9/00 |
| 2021/0004992 A1 * | 1/2021 | Flynn | ......................... | G06T 9/40 |
| 2021/0192797 A1 * | 6/2021 | Lasserre | ................. | G06T 9/001 |
| 2021/0201541 A1 * | 7/2021 | Lasserre | ................ | H04N 19/96 |

(Continued)

*Primary Examiner* — Van D Huynh

(74) *Attorney, Agent, or Firm* — Finnegan, Henderson, Farabow, Garrett & Dunner, L.L.P.

(57) ABSTRACT

A method of encoding a series of data into a bitstream, includes: obtaining a current neighborhood configuration relative to a current data of the series of data, the set of candidate neighborhood configurations being obtained from previously encoded data of the series of data; obtaining a reduced current neighborhood configuration by applying a dynamic reduction function to the current neighborhood configuration, an image of the dynamic reduction function being a set of reduced neighborhood configurations and each reduced neighborhood configuration being associated with a leaf node of a tree, the reduced current neighborhood configuration being obtained by progressing from a root node of the tree until a leaf node based on values of constitutive elements of the current neighborhood configuration; and encoding the current data by using an entropy coder of a set of entropy coders, the entropy coder being selected based on the reduced current neighborhood configuration.

20 Claims, 14 Drawing Sheets

(56) References Cited

U.S. PATENT DOCUMENTS

2021/0400280 A1* 12/2021 Zaghetto .............. H04N 19/119
2022/0383553 A1* 12/2022 Park ........................ G06T 9/001
2024/0406427 A1* 12/2024 Lodhi .................... H04N 19/91
2025/0220220 A1* 7/2025 Hur ...................... H04N 19/537

* cited by examiner z y x

100

110 i

120 i'

130

B

140

N > TH no

160 yes no yes

150

150

151    152    153

100

105

110 i

120 i'

130

B

140

170 no    yes

160 no    yes

N > TH no yes

METHOD AND APPARATUS OF ENCODING/DECODING SERIES OF DATA

CROSS-REFERENCE TO RELATED APPLICATIONS

This application is a U.S. national phase of International Application No. PCT/CN2022/128085, filed on Oct. 27, 2022, which claims priority to and benefits of European Patent Application No. 21306741.6, filed Dec. 10, 2021, the entire contents of both of which are incorporated herein by reference.

FIELD

The present disclosure generally relates to numerical data compression and, in particular to methods and apparatus of encoding/decoding a series of data.

BACKGROUND

The present section is intended to introduce the reader to various aspects of art, which may be related to various aspects of at least one embodiments of the present disclosure that is described and/or claimed below. This discussion is believed to be helpful in providing the reader with background information to facilitate a better understanding of the various aspects of the present disclosure.

Numerical data, denoted data in the following, may be used in many domains for representing different physical data.

For example, data may be used for obtaining a 3D representation of physical objects.

As a format for the representation of 3D data, point clouds have recently gained traction as they are versatile in their capability in representing all types of physical objects or scenes.

SUMMARY

The following section presents a simplified summary of at least one embodiment in order to provide a basic understanding of some aspects of the present disclosure. This summary is not an extensive overview of an embodiment. It is not intended to identify key or critical elements of an embodiment. The following summary merely presents some aspects of at least one of the embodiments in a simplified form as a prelude to the more detailed description provided elsewhere in the document.

According to a first aspect of the present disclosure, there is provided a method of encoding a series of data, into a bitstream, the method comprising:

obtaining a current neighborhood configuration of a set of candidate neighborhood configurations relative to a current data of the series of data, said set of candidate neighborhood configurations being obtained from previously encoded data of the series of data;

obtaining a reduced current neighborhood configuration by applying a dynamic reduction function to the current neighborhood configuration, the image of the dynamic reduction function being a set of reduced neighborhood configurations and each reduced neighborhood configuration being associated with a leaf node of a tree; the reduced current neighborhood configuration being obtained by progressing from a root node of the tree until a leaf node based on values of constitutive elements of the current neighborhood configuration;

encoding the current data by using an entropy coder of a set of entropy coders, said entropy coder being selected based on the reduced current neighborhood configuration;

incrementing a number of use relative to the use of the reduced current neighboring information;

if said number of use exceeds a threshold, then updating the dynamic reduction function by replacing the reduced neighborhood configuration in the image of the reduction function by at least two new reduced neighborhood configurations;

obtaining a new tree from the tree by attaching at least two new leaf nodes, associated with the at least two new reduced neighborhood configurations, to an old leaf node associated with the reduced neighborhood configuration; and initializing a number of use relative to the use of each new reduced neighborhood configuration.

According to a second aspect of the present disclosure, there is provided a method of decoding a series of data, from a bitstream, the method comprising:

obtaining a current neighborhood configuration of a set of candidate neighborhood configurations relative to a current data of the series of data, said set of candidate neighborhood g configurations being obtained from previously decoded data of the series of data;

obtaining a reduced current neighborhood configuration by applying a dynamic reduction function to the current neighborhood configuration, the image of the dynamic reduction function being a set of reduced neighborhood configurations and each reduced neighborhood configuration being associated with a leaf node of a tree; the reduced current neighborhood configuration being obtained by progressing from a root node of the tree until a leaf node based on values of constitutive elements of the current neighborhood configuration;

decoding the current data by using an entropy decoder of a set of entropy decoders, said entropy decoder being selected based on the reduced current neighborhood configuration;

incrementing a number of use relative to the use of the reduced current neighborhood configuration;

if said number of use exceeds a threshold, then updating the dynamic reduction function by replacing the reduced neighborhood configuration in the image of the reduction function by at least two new reduced neighborhood configurations;

obtaining a new tree from the tree by attaching at least two new leaf nodes, associated with the at least two new reduced neighborhood configurations, to an old leaf node associated with the reduced neighborhood configuration; and initializing a number of use relative to the use of each new reduced neighborhood configuration.

According to a third aspect of the present disclosure, there is provided an apparatus of encoding, into a bitstream, point cloud geometry data represented by geometrical elements occupying some discrete positions of a set of discrete positions of a multi-dimensional space. The apparatus comprising one or more processors configured to carry out the method according to the first aspect of the present disclosure.

According to a fourth aspect of the present disclosure, there is provided an apparatus of decoding, from a bitstream, point cloud geometry data represented by geometrical elements occupying some discrete positions of a set of discrete positions of a multi-dimensional space. The apparatus comprising one or more processors configured to carry out the method according to the second aspect of the present disclosure.

The specific nature of at least one of the embodiments as well as other objects, advantages, features and uses of said at least one of embodiments will become evident from the following description of examples taken in conjunction with the accompanying drawings.

BRIEF DESCRIPTION OF THE DRAWINGS

Reference will now be made, by way of example, to the accompanying drawings which show embodiments of the present disclosure, and in which:

FIG. 12 shows a schematic block diagram of the method 100 in accordance with at least one embodiment;

Similar reference numerals may have been used in different figures to denote similar components.

DETAILED DESCRIPTION

Figure 1:
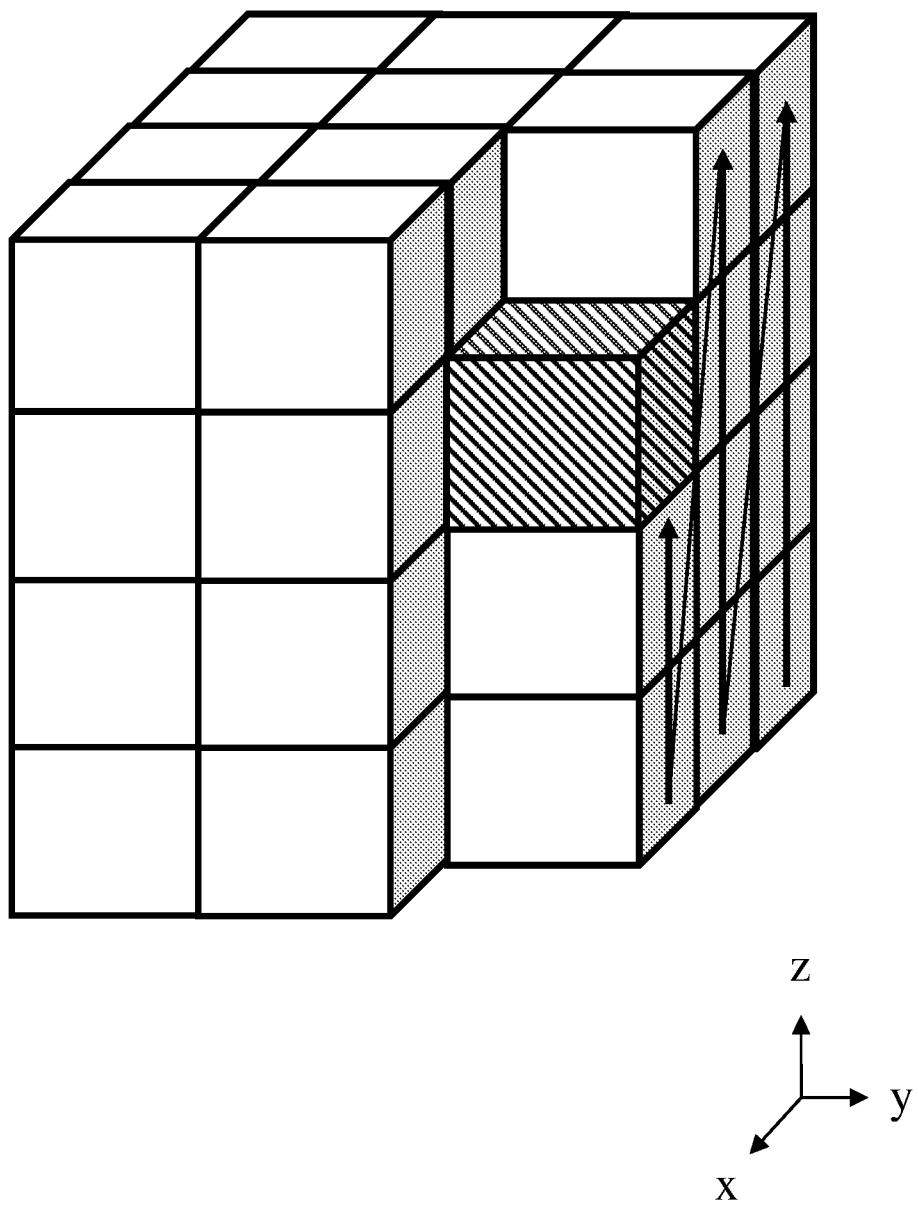
FIG. 1 shows schematically an example of a voxel representation in accordance with the related art.

At least one of the embodiments is described more fully hereinafter with reference to the accompanying figures, in which examples of at least one of the embodiments are depicted. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the present disclosure.

At least one of the aspects generally relates to data encoding and decoding, one other aspect generally relates to transmitting a bitstream generated or encoded and one other aspects relates to receiving/accessing a decoded bitstream.

Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allow for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a three-dimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of geometry data (locations of the points in a 3D space usually represented by 3D cartesian coordinates x, y and z) and attributes.

Point clouds may be sensed by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, aka Moving Picture Experts Group or MPEG, has initiated work items on point cloud compression. This has led to two standards, namely MPEG-I part 5 (ISO/IEC 23090-5) or Video-based Point
    Cloud Compression (aka V-PCC)
  MPEG-I part 9 (ISO/IEC 23090-9) or Geometry-based
    Point Cloud Compression (aka G-PCC)

Point cloud geometry data may be represented by geometrical elements defined in a three-dimensional space.

For example, point cloud geometry data may be represented by a voxel representation as depicted on FIG. 1. A voxel representation splits a bounding box surrounding a point cloud into three-dimensional geometrical elements denoted voxels. The voxel representation may be scanned in a raster scan order.

On FIG. 1, the order shown follows a raster scan firstly in y, secondly in x and finally in z. Point cloud geometry data may be entirely represented in a voxel representation and each occupied voxel, i.e. voxels comprising each at least a point of the point cloud, may be accessed from the raster scan order in xyz (or yxz or any axis order) for example. A binary data $f_j$ is usually associated with each voxel j to indicate that at least one point of the point cloud is comprised in the voxel. This binary data is commonly called occupancy data or occupancy flag. For example, a binary data $f_j$ equals to 0 indicates that a voxel j is unoccupied (does not comprise a point of the point cloud) and a binary data $f_j$ equals to 1 indicated that at least one point is comprised in the voxel j.

In G-PCC, an octree representation is used for representing point cloud geometry data. The geometrical elements are nodes of said octree, each node being associated with a cube (or more generally a "shoebox-shaped" cuboid) comprising at least one point of the point cloud. A root cube is associated with the root node of the octree. This root cube is split into eight equal child cubes associated with the eight child nodes of the root node. The child cubes are scanned in a predetermined scan order. Each child cube is marked occupied or unoccupied depending upon the presence or not of at least one point of the point cloud in the child cube. The split is applied recursively to child-cubes, grand-child-cubes, etc., until a predetermined maximum depth is reached. In G-PCC, the scanning is performed in a breadth-first order, i.e. all nodes of a given depth are processed before those of the next depth. The point cloud is coded as a set of points located in occupied leaf nodes having maximum depth, for instance at the centre of such nodes. Consequently, the set of points of the point cloud is entirely determined by the root cube, the predetermined scan order of child nodes, the maximum depth and an 8-bit occupancy pattern associated with each occupied internal node. The 8-bit occupancy pattern comprises 8 binary data $f_j$ each associated with a child node j, the binary data $f_j$ indicates the occupancy data of the associated child node j.

Encoding point cloud geometry data comprises coding a series of the binary data $f_j$ by an entropy coder.

The binary data $f_j$ may be associated with a voxel of a voxel representation or a child node of an octree defined over a voxel representation.

Encoding/decoding a binary data $f_j$ of a series of binary data requires that a binary entropy coder associated with the binary data $f_j$ be selected among a set of binary entropy coders. A binary entropy coder requires an internal probability that is determined from relevant available (i.e. already coded) information and correlation to obtain a high coding efficiency. The binary entropy coders are usually selected based on neighborhood occupancy configurations (contexts), each entropy coder being associated with a particular internal probability determined based on a particular neighborhood occupation configuration associated with the current node/cube (or cuboid)/voxel to be coded. A neighborhood occupancy configuration is a set of occupancy data associated with nodes/cubes (or cuboids)/voxels belonging to a causal neighborhood relative to a current node/cube (or cuboid)/voxel for which a binary data $f_j$ is to be entropy encoded.

FIG. 1 shows schematically a neighboring causality of already coded nodes/cubes/voxels (white cubes) toward a current node/cube/voxel (hashed cube) to be coded. Already coded neighboring nodes/cubes/voxels are those whose raster scan order is lower than the order of the current node/cube/voxel.

Figure 2:
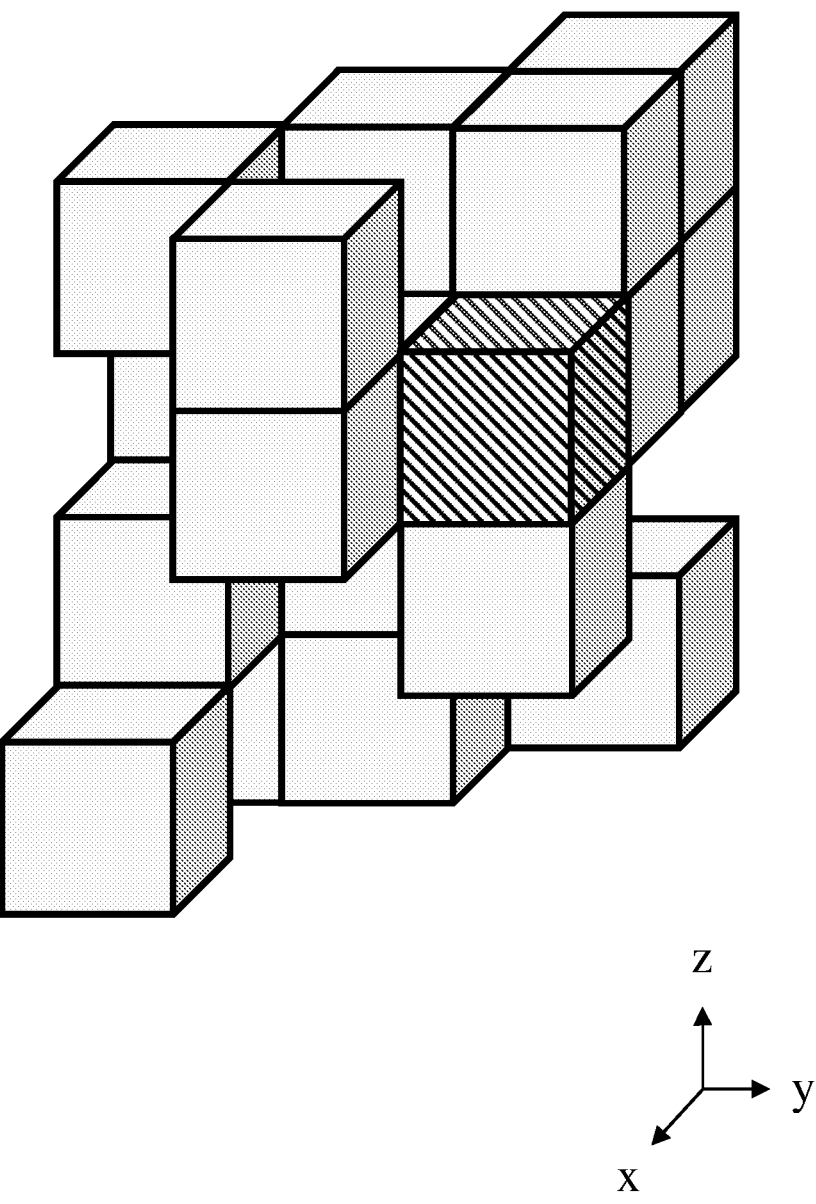
FIG. 2 shows schematically an example of a neighborhood occupancy configuration in accordance with the related art.

FIG. 2 shows schematically an example of a neighborhood occupancy configuration, i.e. an example of a causal neighborhood of a current node/cube/voxel for which only occupied nodes are drawn. The number of possible neighborhood occupancy configurations is $2^N$ where N is the number of nodes/cubes/voxels involved in the causal neighborhood.

Figure 3:
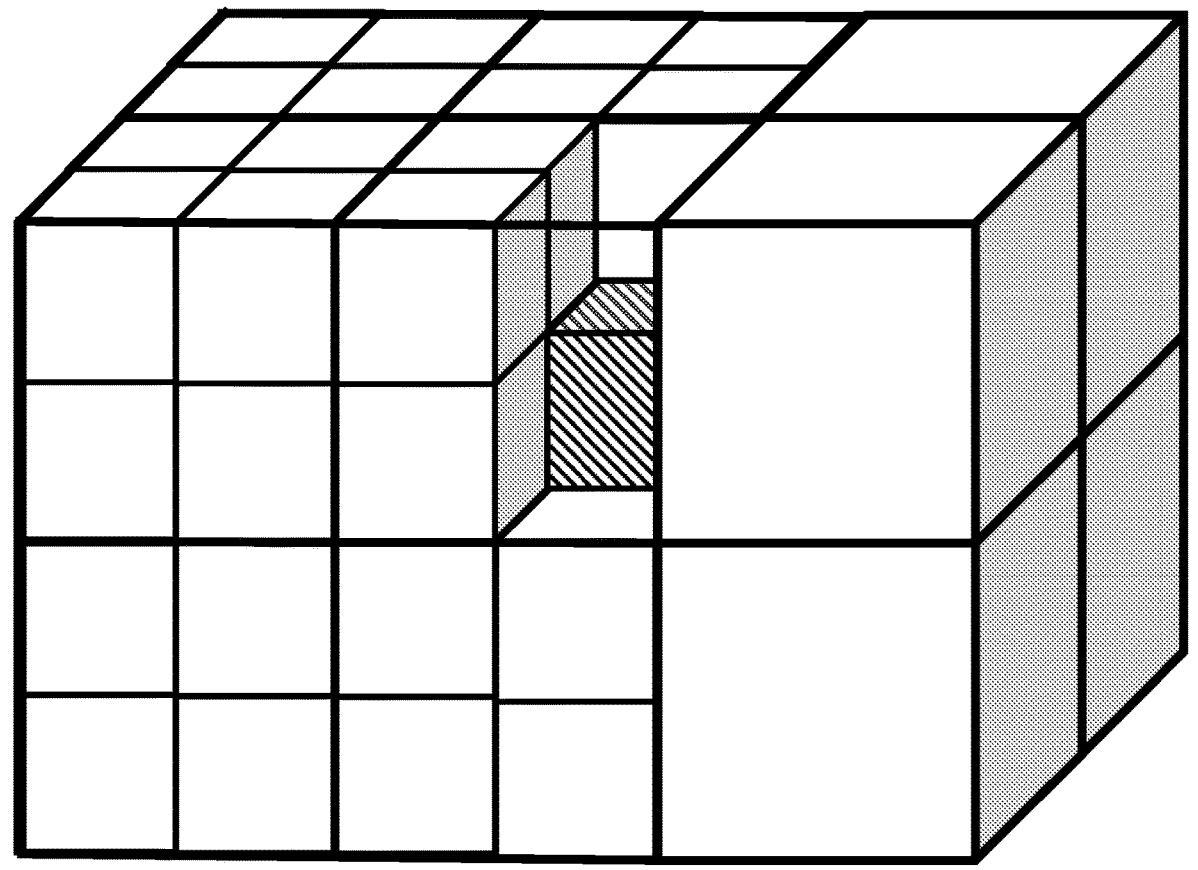
FIG. 3 shows schematically an example of the occupancy data of nodes at lower depth in accordance with the related art.
Figure 3:
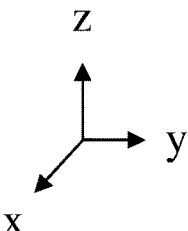

In an octree representation of the point cloud, if nodes are processed in a breadth-first order as in G-PCC, one may profit from the knowledge of the occupancy data of nodes at lower depth as depicted on FIG. 3.

Nodes at depth lower than the current node are used to obtain geometry information in regions (here for y higher than the y of the current node) not yet coded at current depth.

In G-PCC, a combination of neighboring nodes at current depth and current depth minus one is used to define a neighborhood. However, in order to limit the number of possible neighborhood occupancy configurations, the neighborhood has been limited to a subset of the set of nodes adjacent (defined as "sharing a face with") to the current node.

Figure 4:
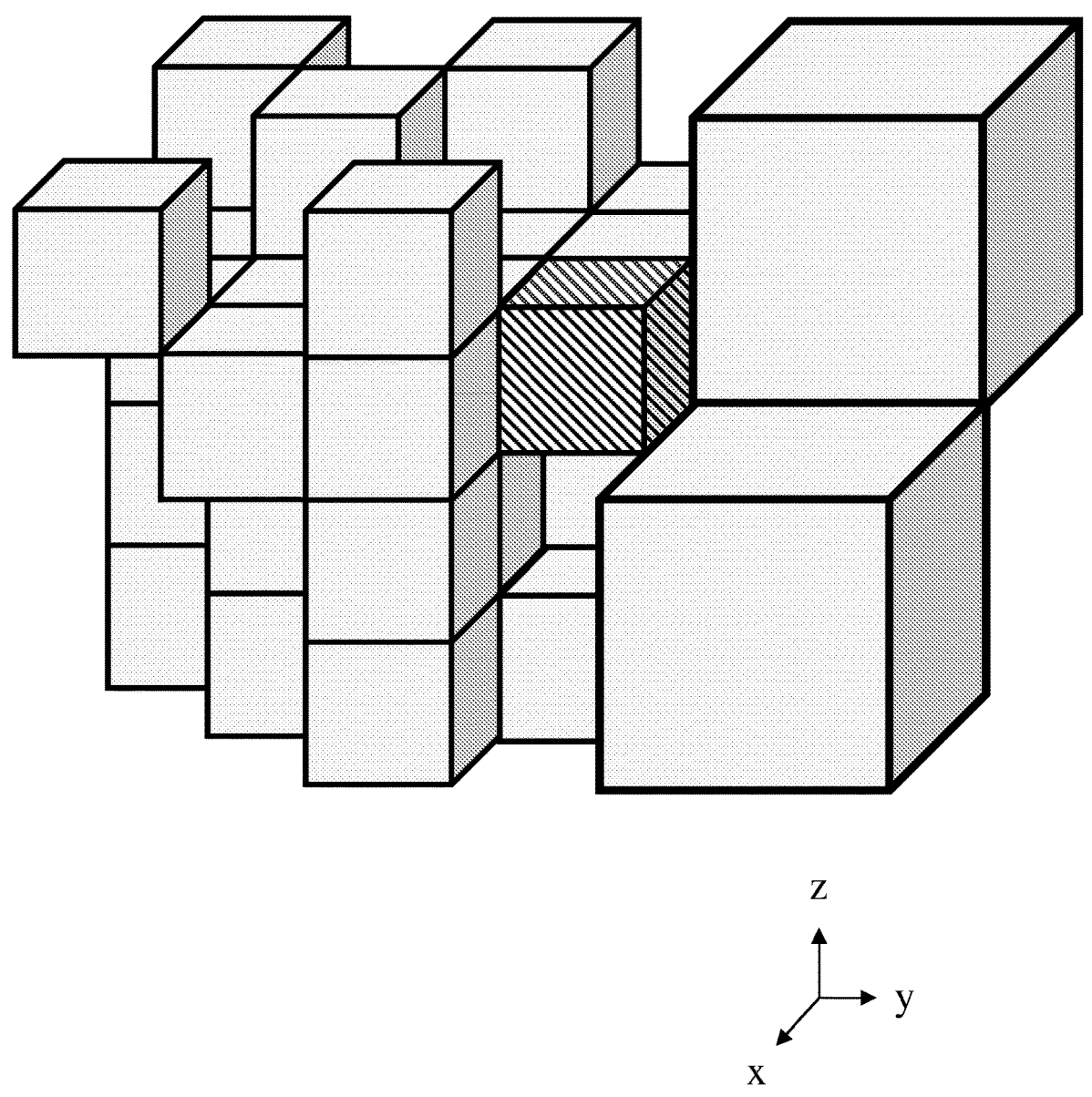
FIG. 4 shows schematically an example of a neighborhood occupancy configuration when neighboring nodes of depth lower than the current depth are also involved in accordance with the related art.

FIG. 4 shows schematically an example of a neighborhood occupancy configuration when neighboring nodes of depth lower than the current depth are also involved.

Point cloud geometry data may also be represented by a coarse representation defined in a two-dimensional coordinate space.

For example, in the working group ISO/IEC JTC 1/SC 29/WG 7 on MPEG 3D Graphics Coding, a codec named L3C2 (Low-Latency Low-Complexity Codec) is being considered to improve, relative to the G-PCC codec, the coding efficiency of Lidar-sensed point clouds. The codec L3C2 provides an example of a two-dimensional representation of the points of a point cloud namely a coarse representation. A description of the code can be found in the output document of the Working Group in N00167, ISO/IEC JTC 1/SC 29/WG 7, MPEG 3D Graphics Coding, "Technologies under Consideration in G-PCC", Aug. 31 2021.

Basically, for each sensed point $P_n$ of the point cloud, a sensor index $\lambda_n$ associated with a sensor that sensed the point $P_n$ and an azimuthal angle $\phi_n$ representing a sense angle of said sensor are obtained by converting 3D cartesian coordinates $(x_n, y_n, z_n)$ representing the 3D location of the sensed point $P_n$. Points of the point cloud are then ordered based on the azimuthal angles $\phi_n$ and the sensor indices $\lambda_n$, for example, according to a lexicographic order based first on the azimuthal angle and then on the sensor index. The order index $o(P_n)$ of a point $P_n$ is then obtained by:

$$o(P_n) = \phi_n{}^* K + \lambda_n$$

where K is the number of sensors.

Figure 5:
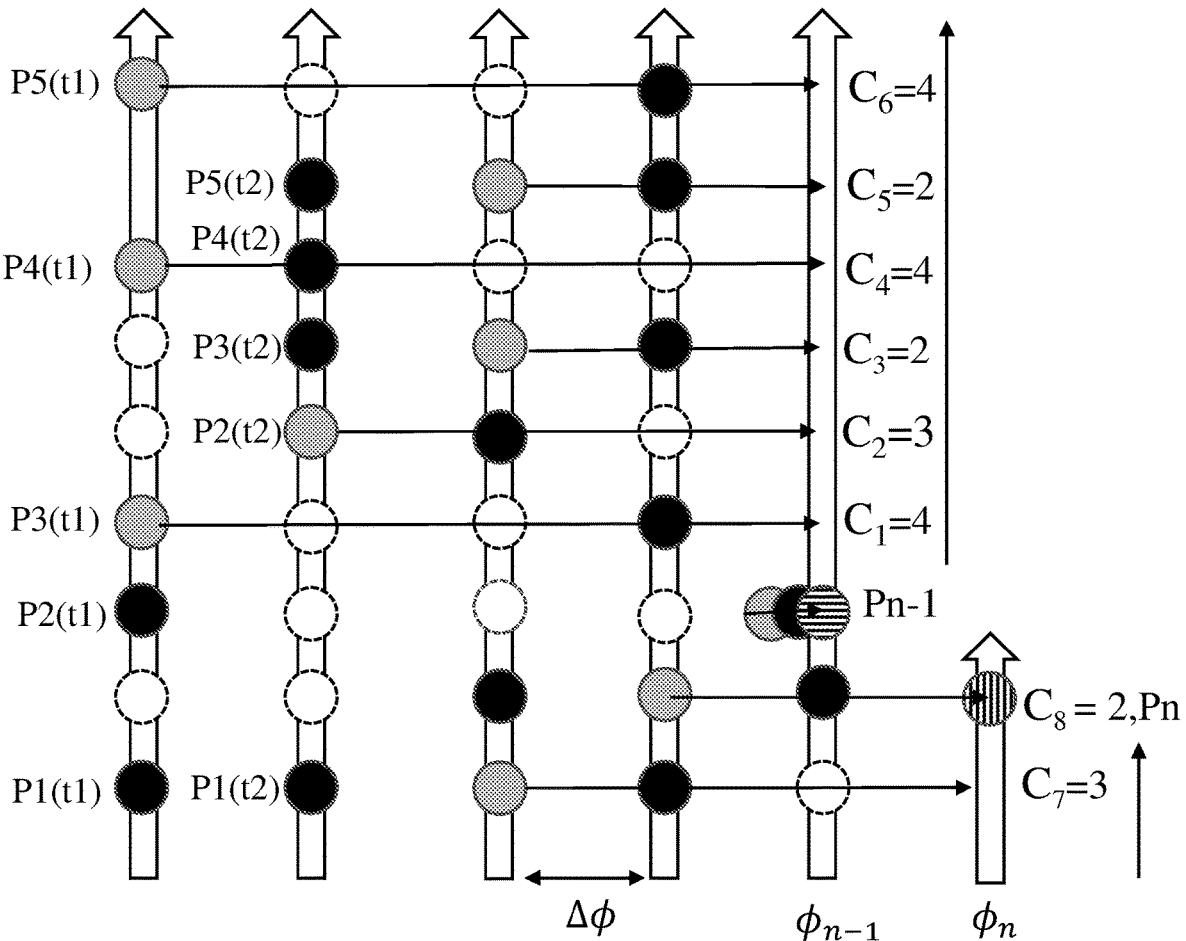
FIG. 5 shows schematically a coarse representation in accordance with the related art.

On FIG. 5, an example of a coarse representation is depicted. The coarse representation is defined in the discrete two-dimensional coordinate $(\phi, \lambda)$ space. A point of the coarse representation, denoted a coarse point, associated with the coordinates $(\phi, \lambda)$ is said occupied (black points) by a sensed point of the point cloud when said point of the point cloud has been sensed by a sensor, associated with the sensor index $\lambda$, with an azimuthal angle $\pi$. Some other coarse points (potential locations of the coarse representation) are said unoccupied (white points) when none of the sensed points of the point cloud corresponds to the coordinates of these potential locations in the discrete two-dimensional coordinate $(\phi, \lambda)$ space.

Encoding point cloud geometry data comprises encoding the occupancies of the coarse points of the coarse representation by encoding order index differences $\Delta o_n$ representing, each, a difference between order indices of two consecutive points $P_{n-1}$ and $P_n$ are obtained by:

$$\Delta o_n = o(P_n) - o(P_{n-1})$$

The order index $o(P_1)$ of the first point $P_1$ may be directly coded into a bitstream. This is equivalent to arbitrary setting the order index of a virtual zero-th point to zero, i.e., $o(P_0) = 0$, and coding $\Delta o_1 = o(P_1) - o(P_0) = o(P_1)$.

Given the order index $o(P_1)$ of the first point and the order differences $\Delta o_n$, one can recursively reconstruct the order index $o(P_n)$ of any point $P_n$ by:

$$o(P_n) = o(P_{n-1}) + \Delta o_n$$

Order index differences $\Delta o_n$ are binarized and the obtained series of binary data $f_j$ is entropy encoded as follows: for each binary data $f_j$, a binary entropy coder is selected among a set of binary entropy coders based on a difference $C_j$ between an azimuthal angle $\phi^j$ associated with the binary data $f_j$ and an azimuthal angle of an already encoded point, and the binary data $f_j$ is entropy coded based on the selected binary entropy coder.

In the example of FIG. 5, the order index difference $\Delta o_n$ equals 8 and is binarized into nine binary data $f_0$ to $f_8$ all not equal to a value PV (typically PV=1) except the last one $f_8$ which equals to PV. This binarization is a unary coding of the value of $\Delta o_n$. Azimuthal angles $\phi^0$ to $\phi^6$ respectively associated with binary data $f_0$ to $f_6$ are equal to the azimuthal angle $\phi_{n-1}$ and azimuthal angles $\phi^7$ and $\phi^8$ respectively associated with $f_7$ and $f_8$ are equal to $\phi_n$.

For example, a difference $C_j$ associated with a binary data $f_j$ is calculated between an index of an azimuthal angle $\phi^j$ associated with the binary data $f_j$ and an index of an azimuthal angle $\phi_{penult,j}$ associated with a penultimate already coded point $P_{penult,j}$ with a same sensor index as the sensor index A/associated with the binary data $f_j$. The current point $P_{n-1}$ is never considered in the set of already coded points from which the penultimate already coded point $P_{penult,0}$ is determined:

$$C_j = \phi^j - \phi_{penult,j}$$

On FIG. 5, the distance $C_0$ equals 0 because last and penultimate already coded point with sensor index equals to $\lambda^0 = \lambda_{n-1} = 2$ (by convention the sensor indexing starts from 0), are located at the same angular location $\phi^0 = \phi_{n-1}$ as the current point $P_{n-1}$; this may happen in some specific sensor configuration. Then, $C_1 = 4$ because the difference between, on one hand, the azimuthal angles $\phi_{penult,3}$, associated with the penultimate already coded point (grey point) with the sensor index $\lambda^1 = \lambda_{n-1} + 1 = 3$ associated with $f_1$, and, on the other hand, $\phi^1 = \phi_{n-1}$ equals 4. Then, $C_2 = 3$ because the difference between the azimuthal angles $\phi_{penult,4}$ associated with the penultimate already coded point with the sensor index $\lambda^2 = \lambda_{n-1} + 2 = 4$ associated with $f_2$, and $\phi^2 = \phi_{n-1}$ equals 3, and so on. Further, $C_7 = 3$ because the difference between the azimuthal angles $\phi_{penult,0}$ associated with the penultimate already coded point with the sensor index $\lambda^7 = \lambda_{n-1} + 7 = 9 = 0$ mod K (here K=9) associated with $f_7$ and $\phi^7 = \phi_{n-1} + 1$ equals 3. Finally, $C_8 = 2$ because the difference between the azimuthal angles $\phi_{penult,1}$ associated with the penultimate already coded point with the sensor index $\lambda^8 = \lambda_{n-1} + 8 = 10 = 1$ mod K associated with $f_8$ and $\phi^8 = \phi_{n-1}$ equals 2.

Figure 6:
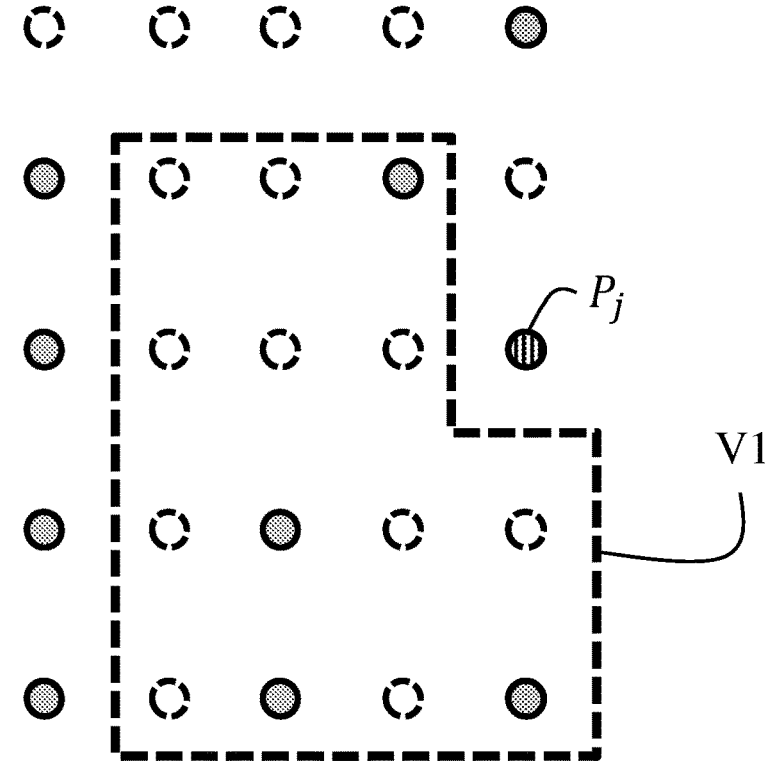
FIG. 6 shows schematically an example of neighborhood defined in a coarse representation in accordance with the related art.

FIG. 6 shows schematically an example of neighborhood defined in a coarse representation in accordance with the related art.

Circles represents coarse points of a coarse representation of a point cloud. Grey shaded points represents occupied coarse points while dash lined circle represents unoccupied coarse points. The coarse points of the representation are ordered according to the particular scanning order of FIG. 5. A causal neighborhood configuration V1 is shown on FIG. 6. The causal neighborhood configuration V1 comprises 14 coarse points. On FIG. 7, another causal neighborhood configuration V2 with a higher dynamic (18 coarse points).

Figure 7:
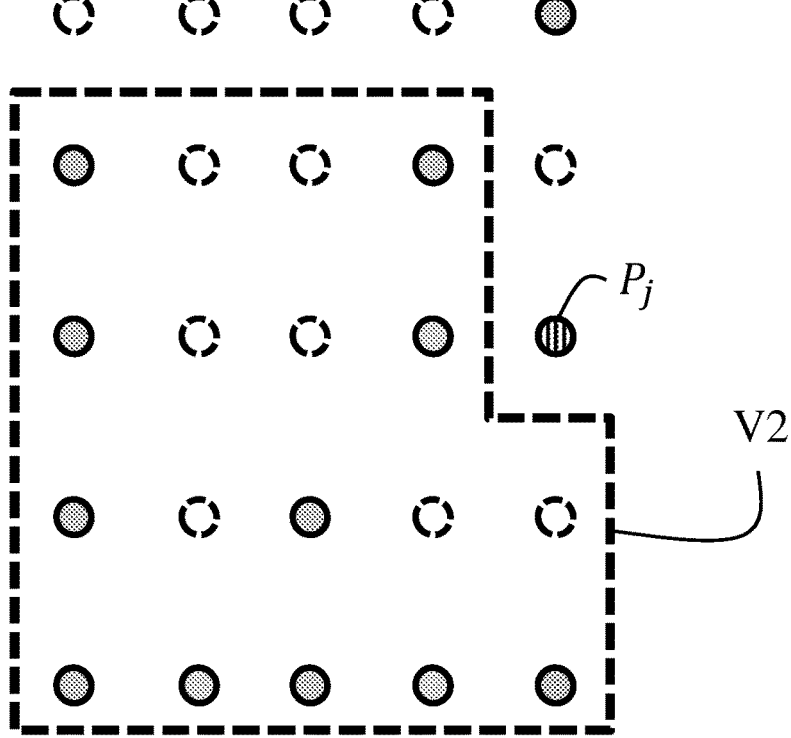
FIG. 7 shows schematically an example of neighborhood defined in a coarse representation in accordance with the related art.

FIG. 7 shows schematically an example of neighborhood defined in a coarse representation in accordance with the related art.

The data of the series of data is not limited to binary data and the dimension of data of the series of data may be greater than 1, i.e. may be non-binary.

For example, in image/video compression domain, data may represent information relative to pixels of an image or of images of a video such color or prediction residual. The data may have a dimension equals to 3 when the pixels colors are represented in the RGB system, and each dimension represents the magnitude of a colored signal typically on 8 or 10 bits. A series of data may then be a set of information relative to pixels of an image or of images of video. Entropy coding/decoding an information relative to a pixel requires a neighborhood configuration obtained from a causal neighborhood of the pixel, i.e. a neighborhood configuration defined from already coded pixels. The color data may be residual color data obtained after a prediction process.

In another example, in genetic domain, data may be the four nucleotides A, T, G, C constituting DNA and the dimension of the data equals to 4. A series of data may be a set of quaternary DNA codes. Entropy coding/decoding a data relative to a DNA code requires selecting an entropy coder among a set of entropy coders based on a neighborhood configuration. The neighborhood configuration is obtained from a causal neighborhood of the DNA code, i.e. a neighborhood configuration defined from already coded DNA codes.

Entropy coding/decoding the data of the series of data having a dimension greater than 1 may be processed either by using binary entropy coders or nonbinary entropy coders.

When binary entropy coders are used, the data may be binarized into binary data and each binary data is entropy coded/decoded. Internal probabilities used by the binary entropy coder may be obtained from a causal neighborhood configuration of the data to be encoded.

When a nonbinary entropy coder is used, for example for entropy coding/decoding data representing the four nucleotides A, T, G, C of the DNA, the internal probabilities are the probabilities $P_A$, $P_T$, $P_G$, $P_C$ of each of the nucleotides.

A drawback of the related arts for entropy coding a series of binary or nonbinary data is their inability to use a big causal neighborhood, big enough to include most of (or all) local correlations, to code the occupancy information of either a node/cube/voxel (three-dimensional geometrical element) in the voxel or octree representations, the occupancy of a coarse point (two-dimensional geometrical element) in the coarse representation, the color information of pixels, or the DNA codes.

In practice, using a big causal neighborhood involves a too high number of possible neighborhood configurations to be used directly in selecting an entropy coder.

In the point cloud geometry data coding domain, several techniques have been proposed to reduce the number of possible neighborhood occupancy configurations.

Firstly, some "physical" arguments have been introduced like the masking of an occupied neighbor by another occupied neighbor placed between the former and the current node/cube/voxel; in this case the information of the former is discarded because this information is supposed to be weaker than the information of the latter.

Secondly, based on learning, local reductions, implemented using Look-Up-Tables (LUT) of limited size, have been proposed but the building of the local reduction depends much on the type of learned point clouds.

Thirdly, a more flexible technique named OBUF (Optimal Binary Coder with Update on the Fly) has been introduced to reduce the number of entropy coders by using a limited number of adaptive entropy coders (say 32). An entropy coder index (say 0 to 31) is associated with each neighborhood occupancy configuration, and, after each coding of a data (occupancy data of a current node), the entropy coder index associated with the neighborhood occupancy configuration of the current node is updated. More details of OBUF can be found in the ACM paper entitled "Using neighboring nodes for the compression of octrees representing the geometry of point clouds" (S. Lasserre et al., ACM MMSys'19, June 2019, Amherst, Massachusetts, USA).

The OBUF scheme has been combined with the first reduction technique, applied before OBUF, to limit the number of entropy coders indices that are dependent on reduced neighborhood occupancy configurations. The MPEG GPCC codec is based on this combination.

The problem is not only the difficulty of implementation (due mostly to memory access) of a high number of neighborhood configurations, but also to see neighborhood configurations being individually rarely visited, consequently leading to poor statistics and then to badly adapted probabilities used for the encoding/decoding of the series of data by the entropy coders. This leads to overall poor compression capability.

For example, a neighborhood involving 20 neighbors (which actually is not many neighbors in a 3D space) would lead to $2^{20}=1$ million possible neighborhood configurations. Consequently, when dealing with series of data having a few millions of data at most, many of the neighborhood configurations will be visited a very limited number of times and it becomes impossible to build reliable statistics per neighborhood configuration.

The related art does not provide satisfactory solutions to tackle the problem.

Solutions based on neighbor masking and reduction LUT are specific to some types of contents. Anyway, LUT with millions of entries are not practical and are trained on a specific type of contents.

Also, OBUF reduces the number of entropy coders (or equivalently of contexts) but the number of entropy coder indices is equal to the number of (reduced) neighborhood configurations and having millions of entropy coder indices is also impractical.

For these reasons, the related art (including the MPEG GPCC codec) have all worked with a spatially very limited neighborhood.

At least one embodiment of the present disclosure has been devised with the foregoing in mind.

Moreover, the present aspects are not limited to MPEG standards such as MPEG-I part 5 or part 9 that relate to the Point Cloud Compression or MPEG-G (ISO/IEC 23092) part 2 that relates to genomic information compression and transport, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present disclosure may be used individually or in combination.

In the illustrative examples of the following figures, each element of a current neighborhood configuration i is a single letter equals to either a, b, c or d. Obviously, the present invention is not limited to these quaternary representation and one skilled in the art may extend the following description to any element including, for example, those representing a neighborhood configuration around a node/cube/voxel, a coarse point, a pixel relative information or a DNA code as illustrated on FIG. 2, 4, 6 or 7. The number of potential values of each element may be 2 (binary information like occupancy information) or greater than 2 (nonbinary information like genomic or color information).

In brief, the present invention relates to methods and apparatuses of encoding/decoding a data of a series into/from a bitstream. A current neighborhood configuration is obtained from a set of candidate neighborhood configurations relative to a current data of the series of data. The set of candidate neighborhood configurations is obtained from previously encoded data of the series of data. A reduced current neighborhood configuration is obtained by applying a dynamic reduction function on the current neighborhood configuration. The image of the dynamic reduction function is a set of reduced neighborhood configurations and each reduced neighborhood configuration is associated with a leaf node of a tree. The reduced current neighborhood configuration is obtained by progressing from a root node of the tree until a leaf node based on values of constitutive elements of the current neighborhood configuration. Next, the current data is encoded by using an entropy coder of a set of entropy coders, said entropy coder being selected based on the reduced current neighborhood configuration. Next, a number of use relative to the use of the reduced current neighboring information is incremented. If said number of use exceeds a threshold, then the dynamic reduction function is updated by replacing the reduced neighborhood configuration in the image of the reduction function by at least two new reduced neighborhood configurations; by obtaining a new tree from the tree by attaching at least two new leaf nodes, associated with the at least two new reduced neighborhood configurations, to an old leaf node associated with the reduced neighborhood configuration; and by initializing a number of use relative to the use of each new reduced neighborhood configuration.

The image of the dynamic reduction function evolves during the coding of the series of data such that the number of possible reduced neighborhood configurations increases during the encoding/decoding methods. At the beginning of the encoding/decoding methods, only a low number of data of the series have been coded such that the statistics correlating the neighborhood configurations and the data are weak. Thus, the dynamic reduction function reduces the dynamic of the neighborhood configurations to a low number of elements (states) in line with the weakness of statistics. During the encoding/decoding of the series of data, the statistics become stronger, and the dynamic reduction function can gradually loosen the dynamic reduction of the neighborhood configurations to higher numbers of elements (states).

The method is particularly adapted for encoding/decoding point cloud geometry data such as binary data representing the occupancies of associated with nodes/cubes/voxels or order index differences (coarse representation). Not all the neighborhood configurations are used (visited) when coding a point cloud. However, they must be kept covering a wide variety of point clouds. For example, coding an AR/VR dense point clouds would lead to some reduced neighborhood configurations to be used, but coding a Lidar sparse point cloud would lead to other reduced neighborhood configurations to be used. That is the primary goal of the dynamic reducing configuration function: further reduce configurations that are rarely or never used and give full potential (i.e. no or weak reduction) to configurations that are often used. The dynamicity comes from the on-the-fly determination of the often-used neighborhood configurations during coding and to the update of the dynamic reduction function based on this determination.

Figures 8, 9:
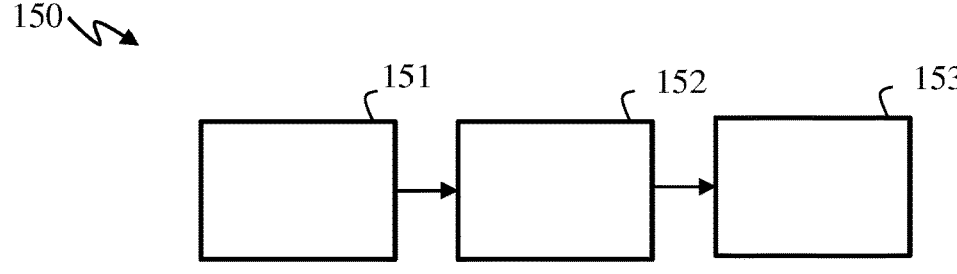
FIG. 8 shows a schematic block diagram of steps of a method 100 of encoding a series of data into a bitstream in accordance with at least one embodiment.
FIG. 9 shows a schematic block diagram of step 150 of the method 100 in accordance with at least one embodiment.

FIG. 8 shows a schematic block diagram of steps of a method 100 of encoding a series of data into a bitstream in accordance with at least one embodiment.

In step 110, a current neighborhood configuration i of a set of candidate neighborhood configurations I is obtained. The current neighborhood configuration i is relative to a current data of the series of data. The set of candidate neighborhood configurations is obtained from previously encoded data of the series of data.

For example, a candidate neighborhood configuration of the set of candidate neighborhood configurations I may be obtained from causal neighborhoods around a node/cube/voxel, a coarse point, a pixel relative information or a DNA code as illustrated on FIG. 2, 4, 6 or 7.

In step 120, a reduced current neighborhood configuration i' is obtained by applying a dynamic reduction function $DR''$ on the current neighborhood configuration i.

Figures 10, 11:
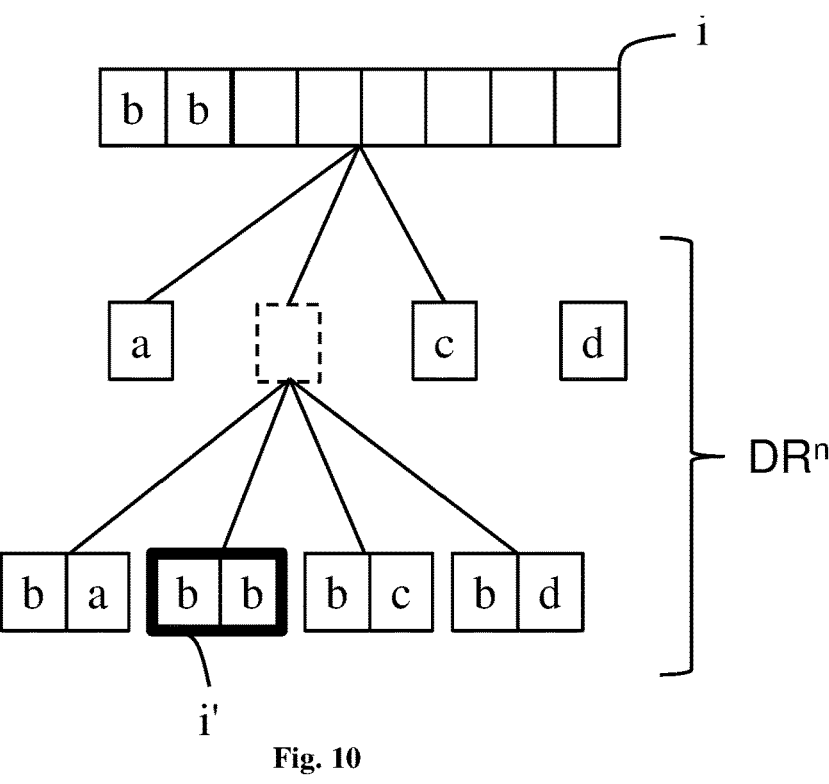
FIG. 10 shows an image of a dynamic reduction function $DR^n$ represented by a tree in accordance with at least one embodiment.
FIG. 11 shows an image of an updated dynamic reduction $DR^{n+1}$ in accordance with at least one embodiment.

The image $Im(DR'')$ of the dynamic reduction function $DR''$ is a set of reduced neighborhood configurations and each reduced neighborhood configuration is associated with a leaf node of a tree as illustrated on FIG. 10.

In the illustrative example of FIG. 10, the current neighborhood configuration i is represented by eight squares each representing one of its elements. Each element of the current neighborhood configuration i is a single letter equals to either a, b, c or d. For example, the two first elements of the current neighborhood configuration i are equal to b.

The reduced current neighborhood configuration i' is obtained by progressing from a root node of the tree until a leaf node based on values of constitutive elements of the current neighborhood configuration i. For example, the image of the dynamic reduction function $DR''$ (n indicates a current status of the dynamic reduction function) is the set of reduced neighborhood configurations a, c, d, ba, bb, bc and bd, and each reduced neighborhood configuration is associated with a leaf node of the tree. In the given example, the reduced current neighborhood configuration i' equals to bb (a compound of the two first elements of the current neighborhood configuration i, independently of the values of the following six elements).

In step 130, the current data is encoded into a bitstream B by using an entropy coder of a set of entropy coders. Said entropy coder is selected based on the reduced current neighborhood configuration i'.

In step 140, a number of use N is incremented. The number $N=N(i')$ is relative to the use of the reduced current neighborhood configuration i'. The number of use N may be obtained from a memory and the incremented number of use N may be store in the memory.

If the number of use N does not exceed a threshold TH, the dynamic reduction function $DR''$ is unchanged because the reduced current neighborhood configuration i' has not been used often enough to be refined. For example, the threshold TH may be equal to 8.

If the number of use N exceeds a threshold TH, then, in step 150, the dynamic reduction function $DR''$ is updated. The updated dynamic reduction function is denoted $DR''^{+1}$ and it refines the reduced current neighborhood configuration i'.

The step 150 of update comprises the sub-steps 151-153 as illustrated on FIG. 9.

In step 151, the reduced current neighborhood configuration i' is replaced in the image of the reduction function $DR''$ by M new reduced neighborhood configurations $NC_m$ (m=1 to M, M>1). Each new reduced neighborhood configurations $NC_m$ is formed as a compound of the elements of the reduced neighborhood configuration i' and an additional neighborhood configuration ANC.

The additional neighborhood configuration ANC comprises K element(s) ANC(k) (k=1 to K, K>0). The potential values of said K element(s) ANC(k) equals the potential values of an element of the current neighborhood configuration i A new neighborhood configuration $NC_m$ is formed for each combination of the potential values of K element(s) ANC(k) of the additional neighborhood configuration: $M=V^K$ with V the number of potential values of each element AC (k) (i.e. the number of potential values of an element of the current neighborhood configuration i).

In step 152, a new tree is obtained from the tree by attaching M new leaf nodes, associated with the M new reduced neighborhood configurations, to an old leaf node associated with the reduced neighborhood configuration i'.

FIG. 11 shows an image of an updated dynamic reduction $DR^{n+1}$ in accordance with at least one embodiment.

The dynamic reduction $DR^{n+1}$ is an update of the dynamic function $DR^n$ of the FIG. 10.

In this example, K=1, V=4 and M=4. The number of use relative to the reduced current neighborhood configuration bb exceed the threshold TH. Then, the dynamic reduction function $DR^{n+1}$ is obtained by replacing the reduced neighborhood configuration bb associated with an old leaf node of the tree of FIG. 10 by M=4 new reduced neighborhood configurations bba, bbb, bbc and bbd. The new tree is obtained from the tree of FIG. 10 by attaching 4 new leaf nodes associated with the 4 new reduced neighborhood configurations bba, bbb, bbc and bbd, to the old leaf node.

Each of these new reduced neighborhood configurations is formed by a compound of the reduced neighborhood configuration bb (associated with a parent note) and a potential value (a, b, c, or d) of each element of the current neighborhood configuration i.

The image of the dynamic reduction function $DR^{n+1}$ comprises the reduced neighborhood configurations a, c, d, ba, bc, bd, bba, bbb, bbc and bbd.

The present invention is not limited to particular values of K and V. For example, the number K of elements of the additional neighborhood configuration ANC may be greater than 1 as illustrated on FIGS. 6 and 7. The causal neighborhood configuration V1 comprises 14 elements while the causal neighborhood configuration V2 comprises 18 elements. An update of the dynamic reduction function may be replacing the neighborhood configuration V1 by the new neighborhood configurations V2. In that case, K=4 (4 new elements are added to the neighborhood configuration V1) and V=1 (each element is a binary occupancy information).

In step 153, a number of use N for each of the M new candidate neighborhood configurations is initialized.

In a variant of step 153, a number of use N for each of said at least two new candidate neighborhood configurations is initialized to 0 by $N(NC_m)=0$, or alternatively the number of use of the reduced current neighborhood configuration i' by $N(NC_m)=N(i')$.

Referring to FIG. 8, after step 150, the encoding method proceeds to step 160. If the current data is not the last data of the series of data to be encoded, the method 100 encodes a next current data of the series of data. Otherwise, the method ends when all the data of the series of data have been encoded.

Initially, the dynamic reduction function $DR^{n=0}$ is defined to maximize the dynamic reduction of the neighborhood configurations used for encoding the data of the series of data. Further dynamic reduction functions $DR^{n>0}$ relax the dynamic reductions on the often-use (often-visited) reduced neighborhood configurations. One obtains a tower of dynamic reduction functions $DR^n$ with increasing image size:

$$\#\mathrm{Im}\left(DR^0\right) < \#\mathrm{Im}\left(DR^1\right) < \ldots < \#\mathrm{Im}(DR^n) < \#\mathrm{Im}\left(DR^{n+1}\right) < \ldots$$

Figure 12:
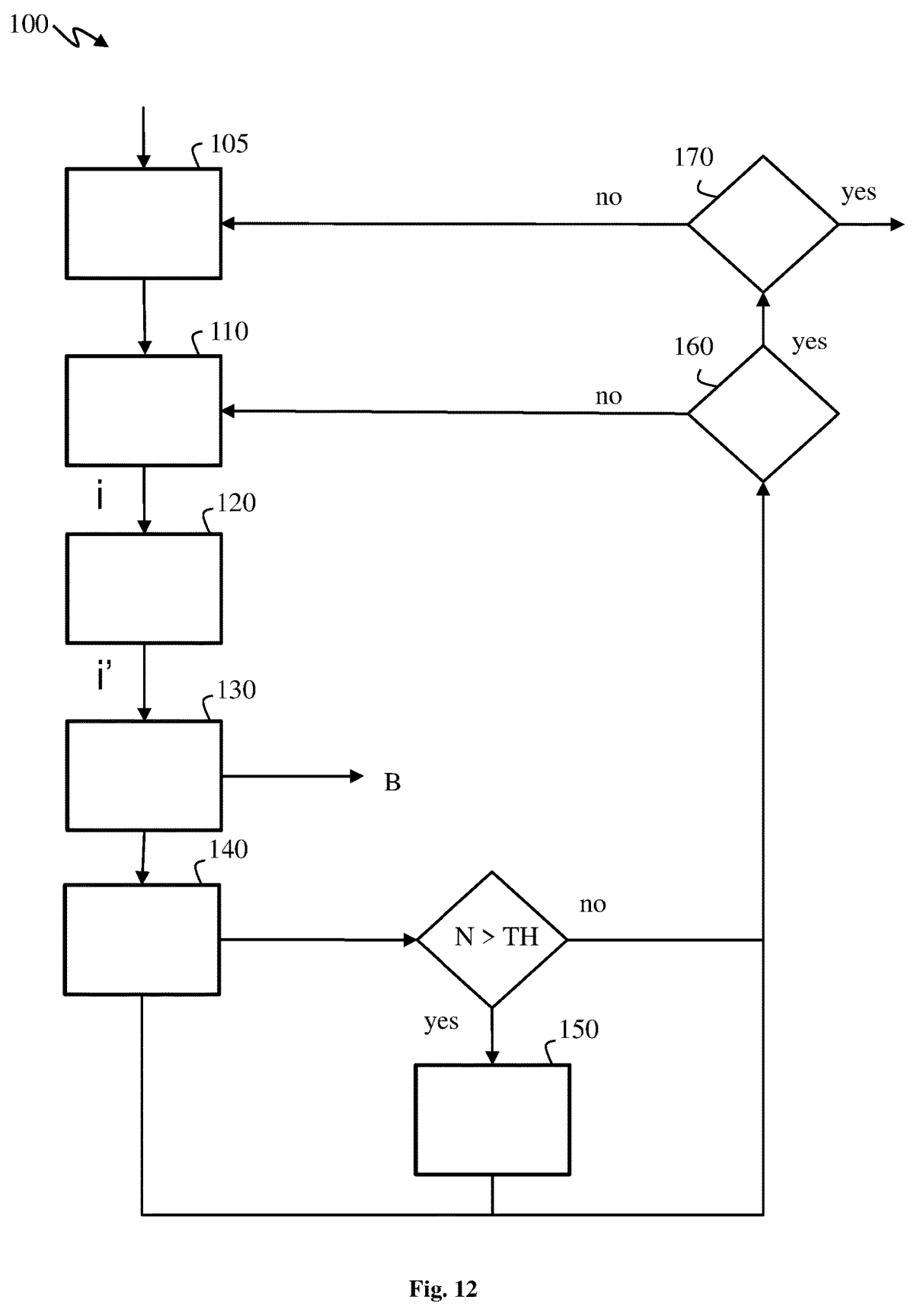

In one embodiment, illustrated on FIG. 12, the method 100 may further comprise obtaining (step 105) a set of at least one binary data by binarizing a current data of the series of data. One binary data of the set of binary data is obtained (step 110) and encoded (steps 120-150). A next binary data of the set of binary data is obtained and encoded until all the binary data of the set of binary data are considered (step 160). Then, a new current data of the series of data is considered (step 170) and a set of at least one binary data is obtained (step 105) by binarizing the new current data. The method ends when all the data of the series are considered.

Figure 13:
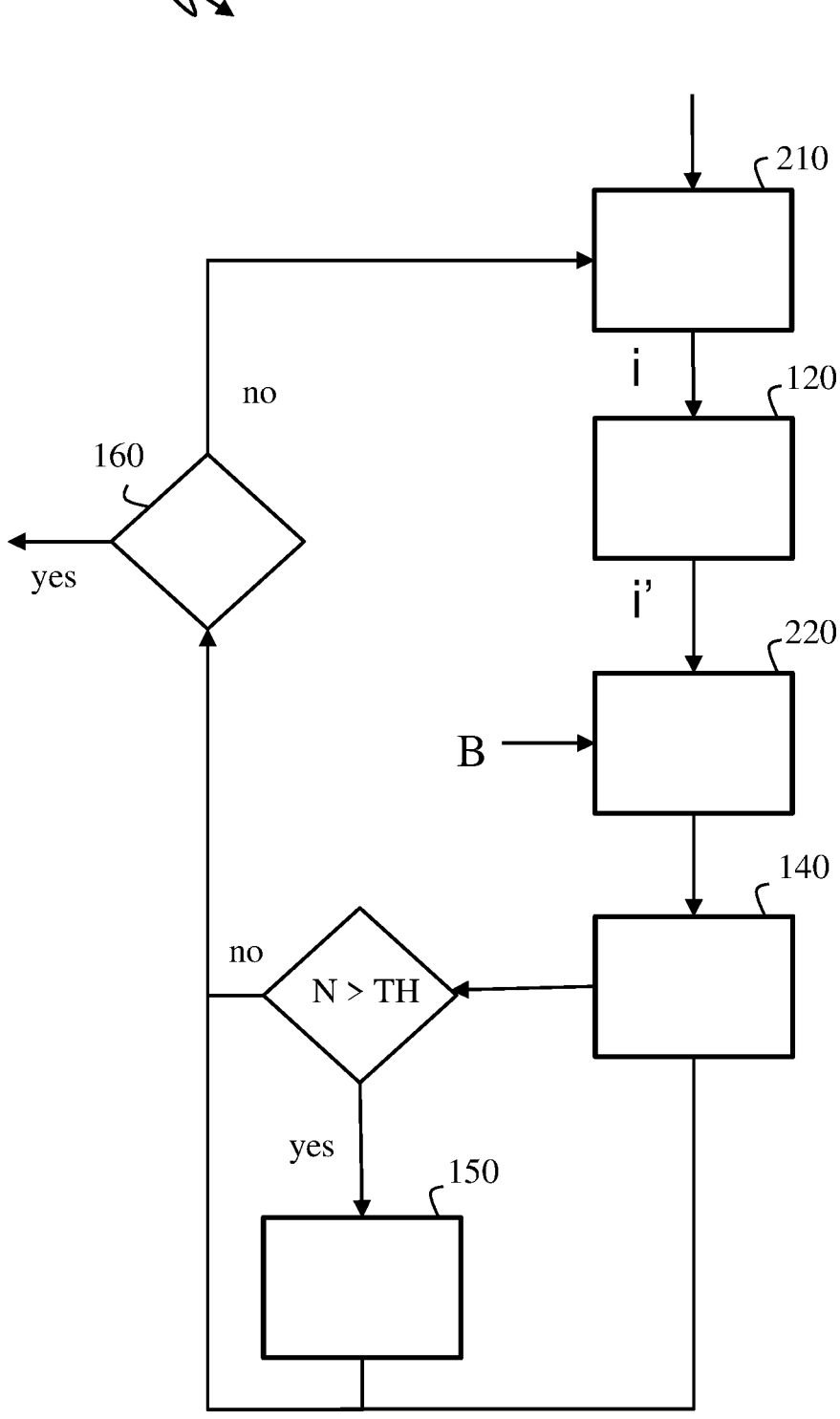
FIG. 13 shows a schematic block diagram of steps of a method 200 of decoding a series of data into a bitstream in accordance with at least one embodiment.

FIG. 13 shows a schematic block diagram of steps of a method 200 of decoding a series of data from a bitstream in accordance with at least one embodiment.

The decoding method 200 is straightforwardly deduced from the encoding method 100.

In step 210, a current neighborhood configuration i of a set of candidate neighborhood configurations I is obtained. The current neighborhood configuration i is relative to a current data of the series of data. The set of candidate neighborhood configurations I is obtained from previously decoded data of the series of data.

Steps 210 and 110 (FIG. 8) obtain same current neighborhood configuration i.

In step 120, a reduced current neighborhood configuration i' is obtained by applying a dynamic reduction function $DR^n$ on the current neighborhood configuration I as above discussed in relation with FIG. 8.

In step 220, a current data of the series of data is decoded from the bitstream B by using an entropy decoder of a set of entropy decoders. Said entropy decoder is selected based on the reduced current neighborhood configuration i'. The selected entropy decoder corresponds to the entropy coder selected for encoding the current data (step 130).

In step 140, a number of use N is incremented. The number N is relative to the use of the reduced current neighborhood configuration i' as above discussed in relation with FIG. 8.

If said number of use N exceeds a threshold TH, then, in step 150, the dynamic reduction function $DR^n$ is updated as above discussed in relation with FIG. 8. Otherwise, the dynamic reduction function $DR^n$ is kept unchanged After step 150, the decoding method proceeds to step 160 and decodes a next current data of the series of data or the method ends when all the data of the series of data have been decoded.

In one embodiment of the method 200, a series of binary data may be decoded by method 200. Then, the method 200 may further comprise obtaining an information from the decoded series of binary data. This corresponds to inverse process of the encoding step 105 of binarization.

In step 130 (220), an entropy coder (decoder), is selected from a set of entropy coders (decoders). Selecting an entropy coder (decoder) may be equivalent to selecting a context or a probability used for entropy coding (decoding) a current data of the series of data.

In one embodiment of step 130 (220), the current data to be encoded (decoded) may be a current binary data d. The current binary data d is then encoded (decoded) by a binary arithmetic coder (decoder) using a probability pr of the current binary data d to be true based on the reduced current neighborhood configuration i'. In this case, the reduced current neighborhood configuration i' may point to the i'-th element of a table T of probabilities such that pr=T[i']. The probability T[i'] may be updated after the coding (decoding) of the current binary data d depending on its value (false vs true, or 0 vs 1).

Figure 14:
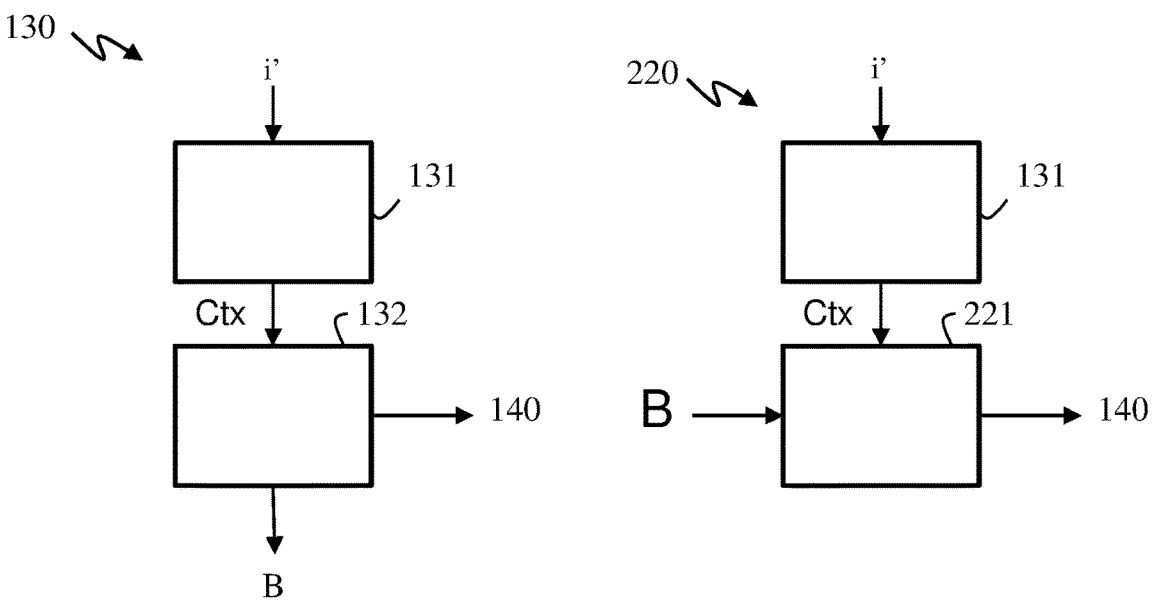
FIG. 14 shows a schematic the step 130 of the method 100 and the step 220 of the method 200 in accordance with at least one embodiment.

In one embodiment step 130 (220), illustrated on FIG. 14, the current binary data d may be context-based adaptive entropy encoded (decoded). Said context-based adaptive entropy encoding (decoding), comprises selecting (step 131) a context Ctx based at least on the reduced current neighborhood configuration i'. The context Ctx may be selected from a table T of contexts based on the reduced current neighborhood configuration i' such that Ctx=T[i']. In step 132, the current binary data d is context-based entropy coded into the bitstream B based on the selected context Ctx. In step 221, the current binary data d is context-based entropy decoded based on the selected context Ctx.

Figure 15:
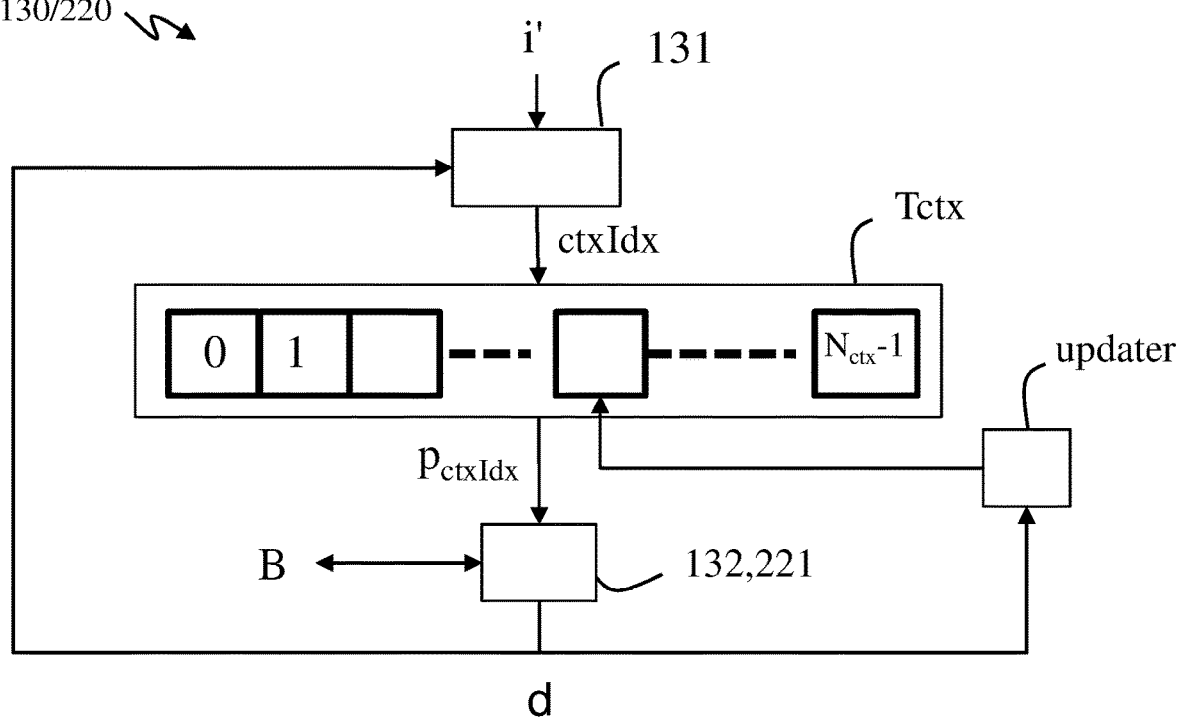
FIG. 15 shows a schematic block diagram of steps of a Context Adaptive Binary Arithmetic Coder in accordance with at least one embodiment.

In one variant, illustrated on FIG. 15, the current binary data d is context-based adaptive entropy encoded or decoded by a Context-Adaptive Binary Arithmetic Coder or decoder (CABAC).

In step 131, the context Ctx is selected by some selection process based at least on the reduced current neighborhood configuration i' to provide a context index ctxIdx associated with the current binary data d.

A context table Tctx with $N_{ctx}$ entries usually store probabilities associated with the contexts and a probability $p_{ctxIdx}$ is obtained as the ctxIdx-th entry of the context table. The context is selected based at least on the reduced current neighborhood configuration i' by Ctx=Tctx[ctxIdx].

For example, the context index ctxIdx may be equal to the reduced current neighborhood configuration i' such that the context Ctx is selected as Ctx=Tctx[i'].

In step 132 (221), the current binary data d is entropy encoded in the bitstream B, respectively entropy decoded from the bitstream B, using the probability $P_{ctxIdx}$.

Entropy coders are usually arithmetic coders but may be any other type of entropy coders like asymmetric numeral systems. In any case, optimal coders add $-\log 2(p_{ctxIdx})$ bits in the bitstream B to encode a current binary data d=1 or $-\log 2(1-p_{ctxIdx})$ bits in the bitstream B to encode d=0. Once the current binary data is encoded (decoded), the probability $p_{ctxIdx}$ is updated by using an updater taking the encoded current binary data and $p_{ctxIdx}$ as entries; the updater is usually performed by using updated tables. The updated probability replaces the ctxIdx-th entry of the context table Tctx. Then, another current binary data d can be encoded, and so on. The update loop back to the context table is a bottleneck in the coding workflow as another current binary data can be encoded only after the update has been performed. For this reason, the memory access to the context table must be as quick as possible and minimizing the size of the context table helps easing its hardware implementation.

A Context-Adaptive Binary Arithmetic decoder performs essentially the same operations as the Context-Adaptive Binary Arithmetic encoder except that the coded current binary data is decoded from the bitstream B by an entropy decoder using the probability $P_{ctxIdx}$.

Selecting an adequate context, i.e. the probability $p_{ctxIdx}$ that estimates at best the chance of a current binary data to be equals to 1, is essential to obtain good compression. Therefore, the context selection should use the data of at least one neighborhood data belonging to a causal neighborhood of the current binary data d, and correlation between them to obtain this adequate context.

Figure 16:
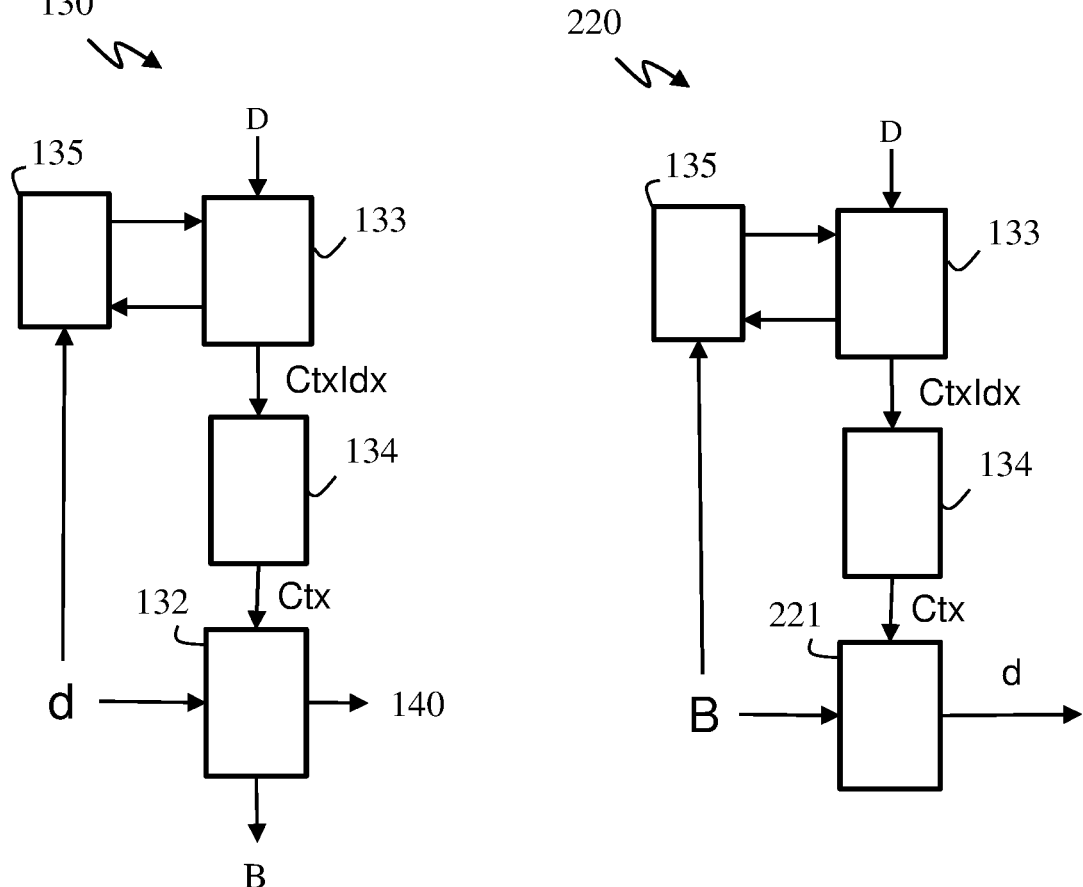
FIG. 16 shows schematically the step 130 of the method 100 and the step 220 of the method 200 in accordance with at least one embodiment.

In one embodiment of step 130 (220), illustrated on FIG. 16, a current binary data d may be encoded (decoded) by a binary arithmetic coder (decoder) with an evolving internal probability and on the base of a context Ctx selected among contexts $C_i, \ldots, C_N$, like CABAC.

In step 133, a context index CtxIdx is selected based on a dependency state D of a set $D_j$, indexed by j from the binary data $f_j$. A set $D_j$ may comprise at least the reduced current neighborhood configuration i':

$$D_j = \{b_{j,0}, \ldots, b_{j,j-1}, i'\}$$

where $b_{j,0}, \ldots, b_{j,j-1}$ are the binary data of the series of binary data to be encoded/decoded.

In one embodiment of step 133 of FIG. 16, the context index CtxIdx may be an entry of a context index table L:

CtxIdx=L[D]

where the context index table L has as many entries as the cardinality of the set $D_j$ of dependency states.

In step 134, a context table Tctx with $N_{ctx}$ entries stores the probabilities associated with the contexts, and a context Ctx associated with a probability $p_{ctxIdx}$ is obtained as the ctxIdx-th entry of the context table by:

Ctx=Tctx[CtxIdx].

In step 132, the current binary data d is encoded in the bitstream B by an entropy coder using the probability $p_{ctxIdx}$ as above discussed.

In step 221, the current binary data d is decoded from the bitstream B by an entropy decoder using the probability $P_{ctxIdx}$ as above discussed.

In step 135, the D-th entry of the context index table L[D] is updated from the encoded current binary data d to a new value $L_{updated}[D]$.

In one variant, the update may be performed based on a model of a memory channel such as $$L_{updated}[D] = (M^*L[D] + d)/(M + 1)$$

where M is the length of the memory.

In one variant, a memory channel may be implemented by using two other fixed look Up Tables LM0 and LM1 b $$L_{updated}[D] = LM0[L[D]] \text{ if } d = 0,$$

$$L_{updated}[D] = LM1[L[D]] \text{ if } d = 1.$$

The associated decoder performs essentially the same operations the encoder except that the encoded current binary data d is decoded from the bitstream B by an entropy decoder using the probability $p_{ctxIdx}$.

As above discussed, the entry of a table of contexts T[i'] (FIG. 14) or the entry of the table of contexts Tctx[i'] (FIG. 15) or the entry D (comprising i') of the context index table L[D] (FIG. 16) may be considered. Next, if the number of use N exceeds the threshold TH, the method 100 or 200 further comprises replacing, in step 150, the table entry corresponding to the reduced neighborhood configuration i' (DR"(i)=i') by new entries corresponding to all the candidate neighborhood configurations j which, once reduced by the updated dynamic reduction function, are equal to the reduced current neighborhood configuration $(DR^{n+1}(j)=i')$.

In one embodiment of the methods 100 or 200, the set of candidate neighborhood configurations I may be split as the product of a set $I_1$ of primary neighborhood configurations and a set $I_2$ of secondary neighborhood configurations $$I = I_1 \times I_2$$

where the secondary data $I_2$ is a set of ordered elements of the current neighborhood configuration i.

The current neighborhood configuration i becomes a pair $(i_1, i_2)$ made of a primary neighborhood configuration $i_1$ and a secondary neighborhood configuration $i_2$.

The dynamic reduction function $DR^n$ operates by keeping the primary neighborhood configuration $i_1$ unchanged and by reducing the dynamic of the secondary neighborhood configuration $i_2$:

$$DR^n(i) = DR^n(i_1, i_2) = (i_1, DR^n_{i1}(i_2)) = (i_1, i_2') = i'$$

where the part of the dynamic reduction function operating on the secondary neighborhood configuration is denoted $$DR^n_{i1}$$

to indicate its dependency to the primary neighborhood configuration $i_1$.

The reduced neighborhood configuration i' is the pair $(i_1, i_2')$ made of the primary neighborhood configuration $i_1$ and the reduced secondary neighborhood configuration $i_2'$.

In a variant, the dynamic reduction function $$DR^n_{i1}$$

is initialized (n=0) as a dynamic reduction function $$DR^0_{i1}$$

having an image with a single element:

$$\sharp \mathrm{Im}\left(DR^0_{i1}\right) = 1$$

In a variant, the number of use relative to the use of the reduced current neighborhood configuration i' (step 140) indicates the number of times N(i') the reduced current neighborhood configuration i' is used for encoding previously data of the series of data.

In a variant, the number of use relative to the use of the reduced current neighborhood configuration i' (step 140) indicates a number of times $N(i_1)$ a primary neighborhood configuration $i_1$, comprised in neighborhood configurations of images of dynamic reduction functions, is used for encoding previously data of the series of data. The number of use $N(i_1)$ is independent of the secondary neighborhood configuration $i_2$ (or $i_2'$).

In a variant 150, the secondary neighborhood configuration $i_2$ comprises an ordered series of elements and the reduced secondary neighborhood configuration $i_2'$ is defined by keeping only the first $k_n$ elements of the secondary neighborhood configuration $i_2$.

The number $k_n$ indicates a number of elements kept from the secondary neighborhood configuration $i_2$ to build the reduced secondary neighborhood configuration $i_2'$.

Figure 17:
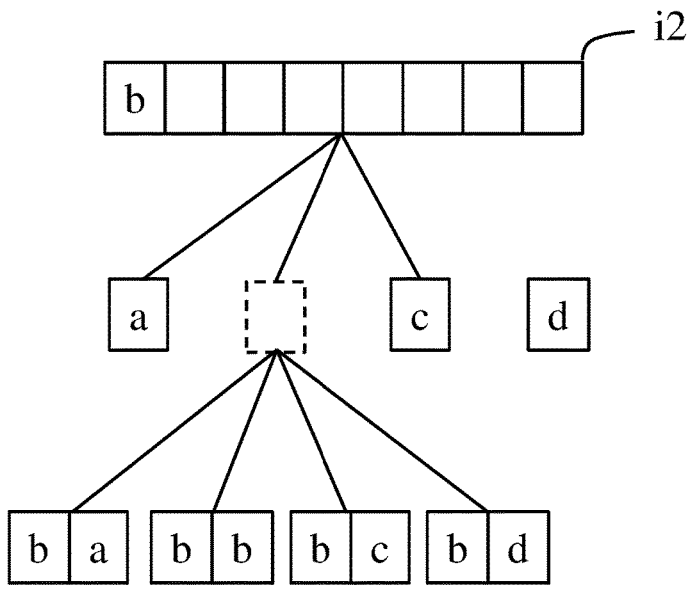
FIG. 17 shows an image of a dynamic reduction function represented by a tree in accordance with at least one embodiment.

In a one embodiment, illustrated on FIG. 17, the numbers $k_n$ depend on the primary neighborhood configuration $i_1$ and the reduced secondary neighborhood configuration $i_2'$.

The numbers $k_n$ may be stored in an array $K_n$ indexed by the primary data $i_1$ and the reduced secondary data $i_2'$ as $K_n(i_1, i_2')=k_n$. The dynamic reduction function $DR^n$ may then be represented by the array $K_n$.

An entry $K_n(i_1, i_2')$ of the array $K_n$ may then be associated with each reduced neighborhood configuration associated with a leaf node of the tree.

The number $k_0$ corresponds to the root node of the tree built for encoding the series of data. For example, $k_0=0$. The numbers $k_n$ are related to the leaf nodes of tree which are associated with the reduced neighborhood configurations. The number $k_n$ $(i_1, axxxxxxx)=1$ relates to the neighborhood configuration a, the number $k_n$ $(i_1, cxxxxxxx)=1$ relates to the neighborhood configuration c, the number $k_n$ $(i_1, dxxxxxxx)=1$ relates to the neighborhood configuration d, the number $k_n$ $(i_1, baxxxxxx)=2$ relates to the neighborhood configuration ba, etc. The index axxxxxxx, cxxxxxxx, etc. refers to the reduced neighborhood configuration having a first element equals to a, the index baxxxxxx refers to the reduced neighborhood configuration having a first element equals to b and a second element equals to a, etc.

When the dynamic reduction function $DR^n$ is updated i.e. when a number of use N relative to the use of a reduced current neighborhood configuration i' exceeds the threshold TH, then the reduced current neighborhood configuration i' is replaced by new reduced neighborhood configurations, the entry of the array $K_n$ associated with the reduced current neighborhood configuration i' is removed, and new entries associated with the new neighborhood configurations are created in the array $K_n$, each of them initialized with a new number $k_n+1$.

This embodiment allows to increase the dynamic of the often-used reduced neighborhood configurations independently to each other. However, the size of the array $K_n$ may be huge when the image of the dynamic reduction function increases.

In one embodiment, the numbers of use relative to the use of the reduced current neighborhood configurations may be stored in an array N indexed by the primary neighborhood configuration $i_1$ and the reduced secondary neighborhood configuration $i_2$ as $N(i_1, i_2')$.

An entry of the array N may then be associated with each reduced neighborhood configuration of the image of the dynamic reduction function $DR^n$.

On FIG. 17, The number $N(i_1, axxxxxxx)$ relates to the neighborhood configuration a, the number $N(i_1, cxxxxxxx)$ relates to the neighborhood configuration c, the number $N(i_1, dxxxxxxx)$ relates to the neighborhood configuration d, the number $N(i_1, baxxxxxx)$ relates to the neighborhood configuration ba, etc.

This embodiment allows to associate a number of use to each reduced neighborhood configuration. However, the size of the array $N(i_1, i_2')$ may be huge when the image of the dynamic reduction function increases.

The dynamic reduction functions $$DR_{i1}^n$$

based on a tree as above discussed ($K_n(i_1, i_2')$, $N(i_1, i_2')$), are very efficient at tracking the most used neighborhood configurations as it tracks each used element individually depending on the preceding elements (usually more relevant elements). This leads to very good compression efficiency especially for coding series of data such as small point clouds because often-used configurations are found out quickly. However, the tree requires a high memory footprint due to the storage of huge arrays $N(i_1, i_2)$ and $K_n(i_1, i_2)$.

Figure 18:
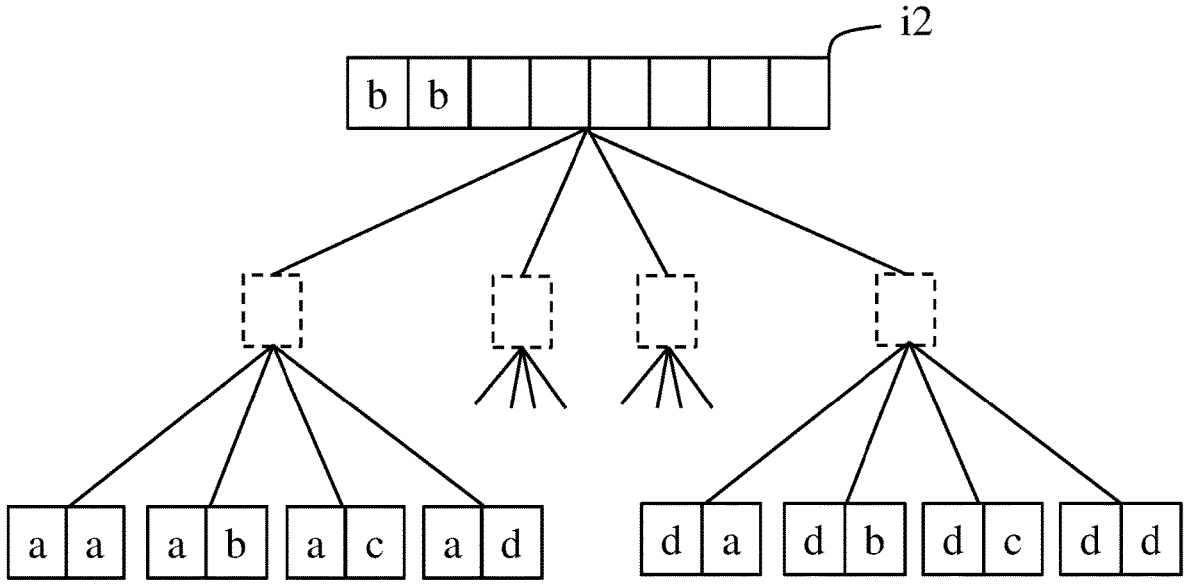
FIG. 18 shows an image of a dynamic reduction function represented by a tree in accordance with at least one embodiment.

In one embodiment, illustrated on FIG. 18, the numbers $k_n$ may depend only on the primary neighborhood configuration $i_1$.

The number $k_n(i_1)$ is independent on the secondary neighborhood configuration $i_2$.

The number $k_n$ may be stored in an array $K_n$ indexed by the primary neighborhood configuration $i_1$ as $K(i_1)=K_n$. An entry $K_n(i_1)$ of the array $K_n$ may then be associated with each depth of the tree.

The number $k_0$ corresponds to the root node of the tree built for encoding the series of data. For example, $k_0=0$. The numbers $k_n$ are related to the leaf nodes of tree which are associated with the reduced neighborhood configurations. The number $K_n(i_1)=K_n(i_1, aaxxxxxx)=K_n(i_1, abxxxxxx)= \ldots =K_n(i_1, ddxxxxxx)=2$ relates to all of the neighborhood configurations at depth d=2.

When the dynamic function $DR^n$ is updated, i.e., when a number of use N relative to the use of a reduced current neighborhood configuration i' associated with a node at a given depth n of the tree exceeds the threshold TH, then all the reduced neighborhood configurations associated with nodes at the depth n are replaced by new neighborhood configurations. The entries of the array $K_n$ relative to all the reduced neighborhood configurations associated with nodes at the depth n are removed and new entries associated with new entries associated with the new neighborhood configurations are created in the array $K_n$, each of them initialized with a new number $k_n+1$ (FIG. 18).

This embodiment allows to keep a reasonable size of the arrays $K_n(i_1)$ when the images of the dynamic reduction functions increase, decreasing the memory footprint of this array. But this embodiment does not allow increasing the dynamic of a single reduced configuration of an image of the dynamic reduction function $DR^n$ when said reduced neighborhood configuration is often used.

In one embodiment, the numbers of use relative to the use of the reduced current neighborhood configurations may be stored in an array $N(i_1)$ indexed by the primary neighborhood configuration $i_1$.

The number $N(i_1)$ is independent on the secondary neighborhood configuration $i_2$.

An entry of the array N may then be associated with each depth of the tree.

A number $N(i_1)$ at a depth d of the tree is associated with all the reduced neighborhood configurations of the tree at the depth d. The number $N(i_1)=N(i_1, aaxxxxxx)=N(i_1, abxxxxxx)= \ldots =N(i_1, ddxxxxxx)$ relates to all of the neighborhood configurations at depth d=2 on FIG. 18.

This embodiment allows to keep a reasonable size of the array $N(i_1)$ when the images of the dynamic reduction functions increase decreasing the memory footprint of the array $N(i_1)$.

Using numbers $k_n$ ($i_1$) and numbers of use $N(i_1)$ which does not depend on the secondary neighborhood configuration $i_2$, leads to an easy implementation of the present invention and compression performance are a little worse than using numbers $k_n$ ($i_1, i_2'$) and numbers of use $N(i_1, i_2')$ which depend on the reduced secondary neighborhood configuration $i_2'$.

In one variant, the numbers $k_n$ and the numbers of use N depend on the first secondary neighborhood configuration $i_1$ and the reduced secondary neighborhood configuration $i_2'$ down to a given depth $d_{max}$ of the tree and depend only on the primary neighborhood configuration $i_1$ from this depth $d_{max}$.

This provides a good trade-off between compression performance and memory footprint.

Figure 19:
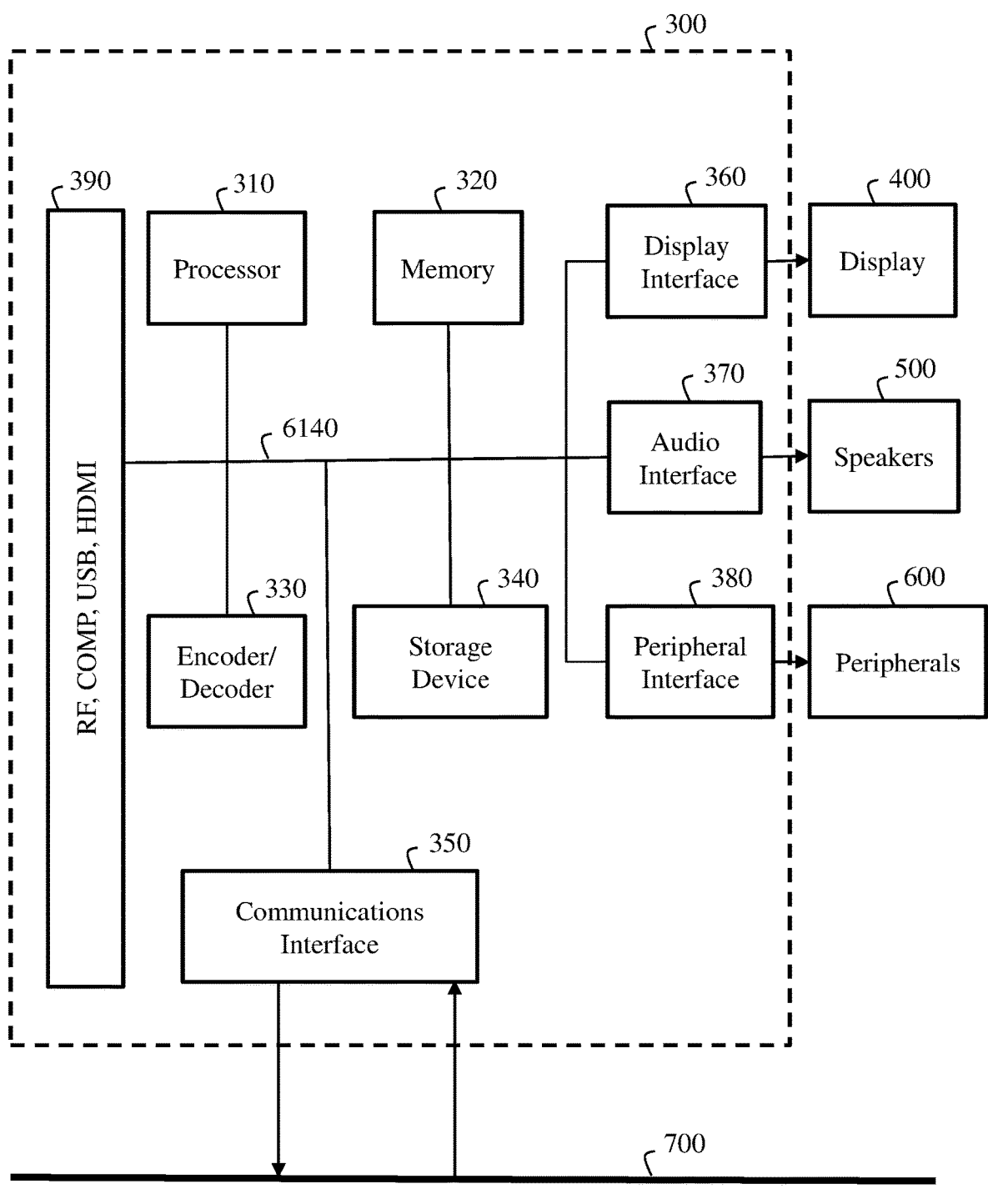
FIG. 19 shows a schematic block diagram of an example of a system in which various aspects and embodiments are implemented.

FIG. 19 shows a schematic block diagram illustrating an example of a system in which various aspects and embodiments are implemented.

System 300 may be embedded as one or more devices including the various components described below. In various embodiments, the system 300 may be configured to implement one or more of the aspects described in the present disclosure.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present disclosure. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, encoded/decoded pixel information, encoded/decoded occupancies flags of nodes/cubes/voxel or coarse points, encoded/decoded DNA codes, and the encoder/decoder module 330 may include its own processor and memory. The encoder/decoder module 330 may represent module(s) that may be included in a device to perform the encoding and/or decoding functions. As is known, a device may include one or both encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder module 330 to perform the various aspects described in the present disclosure may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present disclosure. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 (V-PCC) or part 9 (G-PCC).

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder module 330 operating in combination with the memory and storage elements to process the data stream as necessary for presentation on an output device.

Various elements of system 300 may be provided within an integrated housing. Within the integrated housing, the various elements may be interconnected and transmit data therebetween using a suitable connection arrangement in block 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may comprise the bitstream B and/or information such a number of points of a point cloud, coordinates and/or sensor setup parameters.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of block 390 is part of a separate set-top box. In various embodiments in which the display 400 and speakers 500 may be external components, the output signal may be provided via dedicated output connections, including, for example, HDMI ports, USB ports, or COMP outputs.

In FIG. 1-19, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/ term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present disclosure. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout the present disclosure are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) be included in at least one may embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in the present disclosure, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in the present disclosure, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in the present disclosure may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in the present disclosure.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present disclosure may refer to "obtaining" various pieces of information. Obtaining the information may include one or more of, for example, estimating the information, calculating the information, predicting the information, or retrieving the information from memory.

Further, the present disclosure may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, the present disclosure may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or sensor setup parameters. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by the present disclosure.

The invention claimed is:

1. A method of encoding a series of data, into a bitstream, the method comprising:

obtaining a current neighborhood configuration (i) of a set of candidate neighborhood configurations (I) relative to a current data of the series of data, the set of candidate neighborhood configurations being obtained from previously encoded data of the series of data;

obtaining a reduced current neighborhood configuration (i') by applying a dynamic reduction function (DR″) to the current neighborhood configuration (i), an image of the dynamic reduction function being a set of reduced neighborhood configurations and each reduced neighborhood configuration being associated with a leaf node of a tree; the reduced current neighborhood configuration (i') being obtained by progressing from a root node of the tree until a leaf node based on values of constitutive elements of the current neighborhood configuration (i);

encoding the current data by using an entropy coder of a set of entropy coders, the entropy coder being selected based on the reduced current neighborhood configuration (i');

incrementing a number of use relative to the use of the reduced current neighborhood configuration (i'); and if the number of use exceeds a threshold, updating the dynamic reduction function (DR″) by replacing the reduced neighborhood configuration (i') in the image of the dynamic reduction function (DR″) by at least two new reduced neighborhood configurations;

obtaining a new tree from the tree by attaching at least two new leaf nodes, associated with the at least two new reduced neighborhood configurations, to an old leaf node associated with the reduced neighborhood configuration (i'); and initializing a number of use relative to the use of each new reduced neighborhood configuration.

2. The method of claim 1, wherein the current neighborhood configuration (i) comprises a primary neighborhood configuration ($i_1$) and a secondary neighborhood configuration ($i_2$), and the reduced current neighborhood configuration (i') is obtained as a compound of the primary neighborhood configuration ($i_1$) and a reduced secondary neighborhood configuration ($i_2$') obtained by applying the dynamic reduction function to the secondary neighborhood configuration ($i_2$).

3. The method of claim 1, wherein the number of use relative to the use of the reduced current neighborhood configuration (i') indicates a number of times the reduced current neighborhood configuration (i') has been used for previously encoding data of the series of data.

4. The method of claim 1, wherein the number of use relative to the use of the reduced current neighborhood configuration (i') indicates a number of times a primary data ($i_1$), comprised in neighborhood configurations of images of dynamic reduction functions, has been used for previously encoding data of the series of data.

5. The method of claim 1, wherein the number of use is stored in an array.

6. The method of claim 2, wherein the secondary neighborhood configuration ($i_2$) comprises an ordered series of elements and the reduced secondary neighborhood configuration ($i_2$') is defined by keeping $k_n$ first elements of the secondary neighborhood configuration ($i_2$), where $k_n$ is a given integer number.

7. The method of claim 6, wherein the number $k_n$ is stored in an array.

8. The method of claim 6, wherein the number $k_n$ depends on the primary neighborhood configuration and the reduced secondary neighborhood configuration ($i_2$'), or depends on the primary neighborhood configuration ($i_1$).

9. The method of claim 6, wherein the number $k_n$ and the number of use depend on the first secondary neighborhood configuration ($i_1$) and the reduced secondary neighborhood configuration ($i_2$') down to a given depth ($d_{max}$) of the tree and depend only on the primary neighborhood configuration ($i_1$) from said depth ($d_{max}$).

10. An apparatus of encoding a series of data into a bitstream of encoded point cloud data representing a physical object, the apparatus comprising at least one processor configured to:

obtain a current neighborhood configuration (i) of a set of candidate neighborhood configurations (I) relative to a current data of the series of data, the set of candidate neighborhood configurations being obtained from previously encoded data of the series of data;

obtain a reduced current neighborhood configuration (i') by applying a dynamic reduction function (DR") to the current neighborhood configuration (i), the image of the dynamic reduction function being a set of reduced neighborhood configurations and each reduced neighborhood configuration being associated with a leaf node of a tree; the reduced current neighborhood configuration (i') being obtained by progressing from a root node of the tree until a leaf node based on values of constitutive elements of the current neighborhood configuration (i);

encode the current data by using an entropy coder of a set of entropy coders, the entropy coder being selected based on the reduced current neighborhood configuration (i');

increment a number of use relative to the use of the reduced current neighborhood configuration (i'); and if the number of use exceeds a threshold,
update the dynamic reduction function (DR") by replacing the reduced neighborhood configuration (i') in an image of the dynamic reduction function (DR") by at least two new reduced neighborhood configurations;

obtaining a new tree from the tree by attaching at least two new leaf nodes, associated with the at least two new reduced neighborhood configurations, to an old leaf node associated with the reduced neighborhood configuration (i'); and initializing a number of use relative to the use of each new reduced neighborhood configuration.

11. A method of decoding a series of data, from a bitstream, the method comprising:

obtaining a current neighborhood configuration (i) of a set of candidate neighborhood configurations (I) relative to a current data of the series of data, the set of candidate neighborhood configurations being obtained from previously decoded data of the series of data;

obtaining a reduced current neighborhood configuration (i') by applying a dynamic reduction function (DR") to the current neighborhood configuration (i), an image of the dynamic reduction function being a set of reduced neighborhood configurations and each reduced neighborhood configuration being associated with a leaf node of a tree, the reduced current neighborhood configuration (i') being obtained by progressing from a root node of the tree until a leaf node based on values of constitutive elements of the current neighborhood configuration (i);

decoding the current data by using an entropy decoder of a set of entropy decoders, the entropy decoder being selected based on the reduced current neighborhood configuration (i');

incrementing a number of use relative to the use of the reduced current neighborhood configuration (i'); and if the number of use exceeds a threshold,
updating the dynamic reduction function (DR") by replacing the reduced neighborhood configuration (i') in the image of the dynamic reduction function (DR") by at least two new reduced neighborhood configurations;

obtaining a new tree from the tree by attaching at least two new leaf nodes, associated with the at least two new reduced neighborhood configurations, to an old leaf node associated with the reduced neighborhood configuration (i'); and initializing a number of use relative to the use of each new reduced neighborhood configuration.

12. The method of claim 11, wherein the current neighborhood configuration (i) comprises a primary neighborhood configuration ($i_1$) and a secondary neighborhood configuration ($i_2$), and the reduced current neighborhood configuration (i') is obtained as a compound of the primary neighborhood configuration ($i_1$) and a reduced secondary neighborhood configuration ($i_2$') obtained by applying the dynamic reduction function to the secondary neighborhood configuration ($i_2$).

13. The method of claim 11, wherein the number of use relative to the use of the reduced current neighborhood configuration (i') indicates a number of times the reduced current neighborhood configuration (i') has been used for previously decoding data of the series of data.

14. The method of claim 11, wherein the number of use relative to the use of the reduced current neighborhood configuration (i') indicates a number of times a primary data ($i_1$), comprised in neighborhood configurations of images of dynamic reduction functions, has been used for previously decoding data of the series of data.

15. The method of claim 11, wherein the number of use is stored in an array.

16. The method of claim 12, wherein the secondary neighborhood configuration ($i_2$) comprises an ordered series of elements and the reduced secondary neighborhood configuration ($i_2'$) is defined by keeping $k_n$ first elements of the secondary neighborhood configuration ($i_2$), where $k_n$ is a given integer number.

17. The method of claim 16, wherein the number $k_n$ is stored in an array.

18. The method of claim 16, wherein the number $k_n$ depends on the primary neighborhood configuration and the reduced secondary neighborhood configuration ($i_2'$), or depends on the primary neighborhood configuration ($i_1$).

19. The method of claim 16, wherein the number $k_n$ and the number of use depend on the first secondary neighborhood configuration ($i_1$) and the reduced secondary neighborhood configuration ($i_2'$) down to a given depth ($d_{max}$) of the tree and depend only on the primary neighborhood configuration ($i_1$) from the depth ($d_{max}$).

20. An apparatus of decoding a series of data from a bitstream of encoded point cloud data, the apparatus comprising at least one processor configured to perform the method of claim 11.

\* \* \* \* \*